US008131626B2

(12) United States Patent
Langridge

(10) Patent No.: US 8,131,626 B2
(45) **Date of Patent: *Mar. 6, 2012**

(54) CUSTOMIZABLE TRADING DISPLAY OF MARKET DATA

(75) Inventor: Philip S. Langridge, Saffron Walden (GB)

(73) Assignee: BGC Partners, Inc., New York, NY (US)

( * ) Notice: Subject to any disclaimer, the term of this patent is extended or adjusted under 35 U.S.C. 154(b) by 1337 days.

This patent is subject to a terminal disclaimer.

(21) Appl. No.: 10/759,957

(22) Filed: Jan. 16, 2004

(65) Prior Publication Data

US 2005/0108653 A1 May 19, 2005

Related U.S. Application Data

(63) Continuation-in-part of application No. 10/715,081, filed on Nov. 17, 2003.

(51) Int. Cl.
*G06Q 40/00* (2006.01)

(52) U.S. Cl. .......... 705/37

(58) Field of Classification Search .......... 705/35, 705/36 R, 37

See application file for complete search history.

(56) References Cited

U.S. PATENT DOCUMENTS

| | | | |
|---|---|---|---|
| 2,134,118 | A | 10/1938 | Foss |
| 3,541,526 | A | 11/1970 | Levy et al. |
| 3,573,747 | A | 4/1971 | Adams et al. |
| 3,581,072 | A | 5/1971 | Nymeyer |
| 3,656,148 | A | 4/1972 | Belcher et al. |
| D225,858 | S | 1/1973 | Kline |
| 3,976,840 | A | 8/1976 | Cleveland et al. |
| 4,141,001 | A | 2/1979 | Suzuki |
| 4,412,287 | A | 10/1983 | Braddock, III |
| 4,551,717 | A | 11/1985 | Dreher |
| 4,674,044 | A | 6/1987 | Kalmus et al. |
| 4,677,552 | A | 6/1987 | Sibley et al. |
| 4,789,928 | A | 12/1988 | Fujisaki |
| 4,799,156 | A | 1/1989 | Shavit et al. |
| 4,823,265 | A | 4/1989 | Nelson |
| 4,903,201 | A | 2/1990 | Wagner |
| 4,906,117 | A | 3/1990 | Birdwell |
| D308,693 | S | 6/1990 | Sakaguchi et al. |
| 4,951,196 | A | 8/1990 | Jackson |
| 4,980,826 | A | 12/1990 | Wagner |
| 5,038,284 | A | 8/1991 | Kramer |
| 5,077,665 | A | 12/1991 | Silverman et al. |

(Continued)

FOREIGN PATENT DOCUMENTS

DE 19606467 8/1997

(Continued)

OTHER PUBLICATIONS

Futures, "Guide to Computerized Trading 2003", vol. XXXII, No. 8, 2003; pp. 1-5.*

(Continued)

*Primary Examiner* — Hani Kazimi

(57) ABSTRACT

A method for providing a customizable trading display of market instrument data includes selecting a subset from a plurality of quadrants, with each quadrant associated with one benchmark instrument and each benchmark instrument associated with one or more non-benchmark instruments. Market data is automatically retrieved for the instruments associated with each selected quadrant. A customizable trading display is generated, with the display comprising the subset of quadrants in a selectable layout and each quadrant presenting the associated market data.

25 Claims, 7 Drawing Sheets

U.S. PATENT DOCUMENTS

| | | | |
|---|---|---|---|
| 5,101,353 A | 3/1992 | Lupien et al. | |
| D327,057 S | 6/1992 | Gosch | |
| 5,136,501 A | 8/1992 | Silverman et al. | |
| 5,150,118 A | 9/1992 | Finkle et al. | |
| 5,168,446 A | 12/1992 | Wiseman | |
| 5,181,809 A | 1/1993 | Martin | |
| 5,193,924 A | 3/1993 | Larson | |
| D335,660 S | 5/1993 | Busch | |
| 5,243,331 A | 9/1993 | McCausland et al. | |
| 5,253,940 A | 10/1993 | Abecassis | |
| 5,258,908 A | 11/1993 | Hartheimer et al. | |
| 5,297,031 A | 3/1994 | Gutterman et al. | |
| 5,297,032 A | 3/1994 | Trojan et al. | |
| 5,305,200 A | 4/1994 | Hartheimer et al. | |
| 5,339,392 A | 8/1994 | Risberg et al. | 395/161 |
| 5,347,452 A | 9/1994 | Bay, Jr. | |
| 5,361,199 A | 11/1994 | Shoquist et al. | |
| 5,367,298 A | 11/1994 | Axthelm | |
| 5,373,055 A | 12/1994 | Ohmae et al. | |
| 5,375,055 A | 12/1994 | Togher et al. | |
| 5,463,547 A | 10/1995 | Markowitz et al. | |
| 5,845,266 A | 12/1995 | Lupien | |
| 5,579,002 A | 11/1996 | Iggulden et al. | |
| 5,640,569 A | 8/1997 | Miller et al. | |
| 5,667,319 A | 9/1997 | Satloff | |
| 5,668,358 A | 9/1997 | Wolf et al. | |
| 5,689,652 A | 11/1997 | Lupien et al. | |
| 5,710,889 A | 1/1998 | Clark et al. | |
| 5,715,402 A | 2/1998 | Popolo | |
| 5,717,989 A | 2/1998 | Tozzoli et al. | |
| 5,727,165 A | 3/1998 | Ordish et al. | |
| 5,757,292 A | 5/1998 | Amro et al. | |
| 5,774,880 A | 6/1998 | Ginsberg | |
| 5,787,402 A | 7/1998 | Potter et al. | |
| 5,794,219 A | 8/1998 | Brown | |
| 5,802,497 A | 9/1998 | Manasse | |
| 5,826,244 A | 10/1998 | Huberman | |
| 6,317,728 B1 | 10/1998 | Kane | |
| 5,832,462 A | 11/1998 | Midorikawa et al. | |
| 5,835,896 A | 11/1998 | Fisher et al. | |
| 5,842,178 A | 11/1998 | Giovannoli | |
| 5,845,261 A | 12/1998 | McAbian | |
| 5,873,071 A | 2/1999 | Ferstenberg et al. | |
| 5,878,139 A | 3/1999 | Rosen | |
| 5,905,974 A | 5/1999 | Fraser et al. | |
| 5,905,975 A | 5/1999 | Ausubel | |
| 5,914,715 A | 6/1999 | Sasaki | 345/343 |
| 5,915,209 A | 6/1999 | Lawrence | |
| 5,890,138 A | 7/1999 | Godin et al. | |
| 5,924,082 A | 7/1999 | Silverman et al. | |
| 5,926,801 A | 7/1999 | Matsubara et al. | |
| 6,629,082 B1 | 7/1999 | Hambrecht | |
| 5,950,176 A | 9/1999 | Keiser et al. | |
| 5,963,923 A | 10/1999 | Garber | |
| 5,987,419 A | 11/1999 | Hachino et al. | |
| 6,014,627 A | 1/2000 | Togher et al. | |
| 6,016,483 A | 1/2000 | Rickard et al. | |
| 6,029,146 A | 2/2000 | Hawkins et al. | |
| 6,098,051 A | 8/2000 | Lupien et al. | |
| 6,134,535 A | 10/2000 | Belzberg | |
| 6,141,653 A | 10/2000 | Conklin et al. | |
| 6,151,588 A | 11/2000 | Tozzoli et al. | |
| 6,195,647 B1 * | 2/2001 | Martyn et al. | 705/36 R |
| 6,199,050 B1 | 3/2001 | Alaia et al. | |
| 6,211,880 B1 | 4/2001 | Impink, Jr. | |
| 6,230,146 B1 | 5/2001 | Alaia et al. | |
| 6,230,147 B1 | 5/2001 | Alaia et al. | |
| 6,247,000 B1 | 6/2001 | Hawkins et al. | |
| 6,259,044 B1 | 7/2001 | Paratore et al. | |
| 6,263,321 B1 | 7/2001 | Daughtery, III | |
| 6,272,474 B1 | 8/2001 | Garcia | |
| 6,278,982 B1 | 8/2001 | Korhammer et al. | |
| 6,282,521 B1 | 8/2001 | Howorka | |
| 6,311,178 B1 | 10/2001 | Bi et al. | |
| 6,317,727 B1 | 11/2001 | May | |
| 6,343,278 B1 | 1/2002 | Jain et al. | |
| 6,363,365 B1 | 3/2002 | Kou | |
| 6,405,180 B2 | 6/2002 | Tilfors et al. | |
| 6,421,653 B1 | 7/2002 | May | |
| 6,434,536 B1 | 8/2002 | Geiger | |
| 6,438,575 B1 | 8/2002 | Khan et al. | |
| 6,477,513 B1 | 11/2002 | Walker et al. | |
| 6,505,174 B1 | 1/2003 | Keiser et al. | |
| 6,519,574 B1 | 2/2003 | Wilton et al. | |
| 6,560,580 B1 | 5/2003 | Fraser et al. | |
| 6,625,583 B1 | 9/2003 | Silverman et al. | |
| D491,944 S | 6/2004 | Lutnick et al. | |
| 6,772,132 B1 | 8/2004 | Kemp, II et al. | 705/37 |
| D496,663 S | 9/2004 | Lutnick et al. | |
| D497,912 S | 11/2004 | Lutnick et al. | |
| D498,476 S | 11/2004 | Lutnick et al. | |
| 6,850,907 B2 | 2/2005 | Lutnick et al. | |
| D502,467 S | 3/2005 | Lutnick et al. | |
| D503,712 S | 4/2005 | Lutnick et al. | |
| D503,713 S | 4/2005 | Lutnick et al. | |
| D503,935 S | 4/2005 | Lutnick et al. | |
| D504,131 S | 4/2005 | Lutnick et al. | |
| 6,903,662 B2 | 6/2005 | Rix et al. | |
| 6,912,126 B2 | 6/2005 | Rudd et al. | |
| 6,963,856 B2 | 11/2005 | Lutnick et al. | |
| 6,965,511 B2 | 11/2005 | Rudd et al. | |
| D516,072 S | 2/2006 | Lutnick et al. | |
| 7,000,181 B2 | 2/2006 | Press | 715/503 |
| 7,003,488 B2 | 2/2006 | Dunne et al. | |
| 3,249,919 A1 | 5/2006 | Scantlin | |
| 7,076,461 B2 | 7/2006 | Balabon | |
| 7,080,033 B2 | 7/2006 | Wilton et al. | |
| 7,157,651 B2 | 1/2007 | Rix et al. | |
| 7,243,083 B2 * | 7/2007 | Burns et al. | 705/37 |
| 7,283,067 B2 | 10/2007 | Lutnick et al. | |
| 7,392,212 B2 * | 6/2008 | Hancock et al. | 705/36 R |
| 7,392,214 B1 | 6/2008 | Fraser et al. | |
| 7,392,217 B2 | 6/2008 | Gilbert et al. | |
| 7,400,270 B2 | 7/2008 | Lutnick et al. | |
| 7,496,533 B1 | 2/2009 | Keith | |
| 7,523,064 B2 | 4/2009 | Burns et al. | |
| 7,552,084 B2 | 6/2009 | Fraser et al. | |
| 2001/0003179 A1 | 6/2001 | Martyn et al. | 705/37 |
| 2001/0032175 A1 | 10/2001 | Holden et al. | |
| 2001/0037279 A1 | 11/2001 | Yeo | |
| 2002/0023037 A1 | 2/2002 | White | |
| 2002/0023042 A1 | 2/2002 | Solomon | |
| 2002/0026321 A1 | 2/2002 | Faris et al. | |
| 2002/0029180 A1 | 3/2002 | Kirwin et al. | |
| 2002/0070915 A1 | 6/2002 | Mazza et al. | |
| 2002/0073014 A1 | 6/2002 | Gilbert | |
| 2002/0082976 A1 | 6/2002 | Howorka | |
| 2002/0091626 A1 | 7/2002 | Johnson et al. | |
| 2002/0107784 A1 * | 8/2002 | Hancock et al. | 705/37 |
| 2002/0128945 A1 | 9/2002 | Moss et al. | |
| 2002/0143690 A1 | 10/2002 | Mahajan et al. | |
| 2002/0154038 A1 | 10/2002 | Houston | |
| 2002/0156716 A1 | 10/2002 | Adatia | |
| 2002/0161690 A1 * | 10/2002 | McCarthy et al. | 705/37 |
| 2002/0255642 | 10/2002 | Adatia | |
| 2002/0169703 A1 | 11/2002 | Lutnick et al. | |
| 2002/0169704 A1 | 11/2002 | Gilbert et al. | |
| 2002/0178104 A1 | 11/2002 | Hausman | |
| 2002/0198815 A1 * | 12/2002 | Greifeld et al. | 705/37 |
| 2003/0004862 A1 | 1/2003 | Lutnick et al. | |
| 2003/0009411 A1 * | 1/2003 | Ram et al. | 705/37 |
| 2003/0033239 A1 | 2/2003 | Gilbert | |
| 2003/0050888 A1 | 3/2003 | Satow et al. | |
| 2003/0065613 A1 | 4/2003 | Smith | |
| 2003/0083976 A1 | 5/2003 | McLister | |
| 2003/0097323 A1 | 5/2003 | Khalfan et al. | |
| 2003/0149636 A1 | 8/2003 | Lutnick et al. | |
| 2003/0229571 A1 * | 12/2003 | May | 705/37 |
| 2003/0229900 A1 * | 12/2003 | Reisman | 725/87 |
| 2003/0236737 A1 | 12/2003 | Kemp et al. | |
| 2004/0030634 A1 | 2/2004 | Satow | |
| 2004/0034591 A1 * | 2/2004 | Waelbroeck et al. | 705/37 |
| 2004/0044610 A1 | 3/2004 | Fraser et al. | |
| 2004/0059666 A1 | 3/2004 | Waelbroeck et al. | |
| 2004/0117292 A1 | 6/2004 | Brumfield et al. | |
| 2004/0117331 A1 | 6/2004 | Lutnick et al. | |
| 2004/0140998 A1 | 7/2004 | Gravina et al. | |

| | | | | |
|---|---|---|---|---|
| 2004/0158519 | A1* | 8/2004 | Lutnick et al. | 705/37 |
| 2004/0193519 | A1 | 9/2004 | Sweeting et al. | |
| 2004/0210504 | A1 | 10/2004 | Rutman | |
| 2004/0210511 | A1 | 10/2004 | Waelbroeck et al. | |
| 2004/0210512 | A1 | 10/2004 | Fraser et al. | |
| 2004/0218963 | A1 | 11/2004 | Van Diepen et al. | |
| 2005/0004852 | A1 | 1/2005 | Whitney | 705/35 |
| 2005/0038731 | A1 | 2/2005 | Sweeting et al. | |
| 2005/0038732 | A1 | 2/2005 | Sweeting et al. | |
| 2005/0055304 | A1 | 3/2005 | Lutnick et al. | |
| 2005/0075966 | A1 | 4/2005 | Duka | 705/37 |
| 2005/0108079 | A1 | 5/2005 | Langridge | |
| 2005/0108653 | A1 | 5/2005 | Langridge | |
| 2005/0119966 | A1 | 6/2005 | Sandholm et al. | |
| 2005/0160032 | A1 | 7/2005 | Lutnick et al. | |
| 2005/0171895 | A1 | 8/2005 | Howorka et al. | 705/37 |
| 2005/0216393 | A1 | 9/2005 | Lutnick et al. | |
| 2005/0222941 | A1 | 10/2005 | Tull | |
| 2006/0007160 | A1 | 1/2006 | Lutnick et al. | |
| 2006/0059079 | A1 | 3/2006 | Howorka | |
| 2006/0069635 | A1* | 3/2006 | Ram et al. | 705/37 |
| 2006/0080214 | A1 | 4/2006 | Hausman et al. | |
| 2006/0086726 | A1 | 4/2006 | Yamamoto et al. | |
| 2006/0229967 | A1 | 10/2006 | Sweeting | |
| 2006/0265304 | A1* | 11/2006 | Brumfield et al. | 705/35 |
| 2006/0265305 | A1* | 11/2006 | Schluetter et al. | 705/35 |
| 2006/0271475 | A1* | 11/2006 | Brumfield et al. | 705/39 |
| 2006/0277136 | A1 | 12/2006 | O'Connor et al. | |
| 2007/0100735 | A1 | 5/2007 | Kemp et al. | |
| 2007/0150708 | A1 | 6/2007 | Billeci | |
| 2007/0174162 | A1 | 7/2007 | Lutnick et al. | |
| 2007/0226120 | A1 | 9/2007 | Nanjundamoorthy | |
| 2007/0244795 | A1 | 10/2007 | Lutnick et al. | |
| 2007/0244796 | A1 | 10/2007 | Lutnick et al. | |
| 2007/0250438 | A1 | 10/2007 | Fraser et al. | |
| 2007/0255642 | A1 | 11/2007 | Keith | |
| 2008/0001786 | A1 | 1/2008 | Lutnick et al. | |
| 2008/0071670 | A1 | 3/2008 | Fraser et al. | |
| 2008/0071671 | A1 | 3/2008 | Fraser et al. | |
| 2008/0077523 | A1 | 3/2008 | Fraser et al. | |
| 2008/0140558 | A1 | 6/2008 | Reuter et al. | |
| 2009/0073004 | A1 | 3/2009 | Lutnick et al. | |

FOREIGN PATENT DOCUMENTS

| | | | |
|---|---|---|---|
| EP | 0416482 | | 3/1991 |
| EP | 041230881 | | 12/1991 |
| EP | 0512702 | | 11/1992 |
| EP | 0733963 | B1 | 9/1996 |
| EP | 0828223 | A2 | 3/1998 |
| EP | 099399581 | | 4/2000 |
| EP | 1006472 | | 6/2000 |
| GB | 2256954 | A | 12/1992 |
| GB | 2258061 | | 1/1993 |
| GB | 2313276 | | 11/1997 |
| JP | 358161068 | | 9/1983 |
| JP | 59184929 | | 10/1984 |
| JP | 62-256164 | | 11/1987 |
| JP | 11-282600 | | 3/1998 |
| JP | 2002-032565 | | 7/2000 |
| JP | 2001-501333 | | 1/2001 |
| KR | 1992-700435 | | 2/1992 |
| WO | WO 85/04271 | | 9/1985 |
| WO | WO 85/03115 | | 5/1987 |
| WO | WO 93/15464 | | 8/1993 |
| WO | WO 95/26005 | | 9/1995 |
| WO | WO 96/05563 | A1 | 2/1996 |
| WO | WO 96/34356 | | 10/1996 |
| WO | WO 97/37315 | | 10/1997 |
| WO | WO 98/26363 | | 6/1998 |
| WO | WO 98/34187 | | 8/1998 |
| WO | WO 98/49639 | | 11/1998 |
| WO | WO 98/52133 | | 11/1998 |
| WO | WO 99/19821 | | 4/1999 |
| WO | WO 00/11588 | | 3/2000 |
| WO | WO 00/26745 | | 5/2000 |
| WO | WO/0150317 | | 12/2000 |
| WO | WO 01/69366 | | 9/2001 |
| WO | WO 03/026135 | | 3/2003 |
| WO | WO/2006108158 | | 4/2006 |

OTHER PUBLICATIONS

PCT Notification of Transmittal of the International Search Report and the Written Opinion of the International Searching Authority, or the Declaration, for International Application No. PCT/US04/36126, 6 pages, Jun. 16, 2006.
PCT Notification of Transmittal of the International Search Report and the Written Opinion of the International Searching Authority, International Application No. PCT/US05/00995, 9 pages, Feb. 16, 2007.
*USPTO Office Action Summary* for U.S. Appl. No. 10/715,081; 14 pages, Aug. 10, 2007.
"Hot Keys Now Available", Success Trader Level II—Direct Access Trading, http://web.archive.org/web20020928124458 (printed Feb. 26, 2004).
"NextTrend Releases Next Generation Electronic Direct Access Trading, EDAT, Technology Plus New and Expanded Market Analysis Features", Business Wire, Oct. 29, 2001, 2 pages, www.findarticles.com/cf_dis/m0EIN/2001_Oct29/79515988/p1/article.jhtml (printed Mar. 2, 2004).
"Neovest Updates Trade Execution", Neovest High Performance Trading Technology, Aug. 31, 2001, http://www.neovest.com/recentarticles/article2001831.html (printed Mar. 2, 2004).
Flood, Mark D. "Microstructure Theory and the Foreign Exchange Market", Federal Reserve Bank of St. Louis Review, Nov.-Dec. 1991, vol. 73, No. 6, p. 52(10), retrieved from DIALOG Gale Group Trade and Industry DB, Dialog No. 05586898.
PCT Notification of Transmittal of International Search Report and the Written Opinion of the International Searching Authority, or the Declaration for International Application No. PCT/US02/18539, May 5, 2003.
Photographs of eSpeed, Inc. trading keyboard, May 9, 2004.
Photographs of second eSpeed, Inc. trading keyboard, May 9, 2004.
Levitt, Mark 1996. New PanoView 600 brings big images to small spaces and modular systems. Business Wire Oct. 2, 1996. http://www.proquest.com/ (accessed Jul. 22, 2008).
"Aurora", Chicago Board of Trade, 1990.
"APT: A Trading System for the Future", The London International Financial Futures Exchange (LIFFE).
*eSPEED, Inc. et al.* v. *Brokertec USA, L.L.C. et al*. D. Del. Civil Action No. 03-612(KAJ)—PTS Client v1.1 Beta H:1—Mar. 1998 (Exhibits 118-120).
USPTO Office Action for U.S. Appl. No. 08/766,733, filed May 21, 1998.
USPTO Notice of Allowance for U.S. Appl. No. 08/766,733, filed Sep. 1, 1998.
USPTO Office Action for U.S. Appl. No. 10/147,218, filed Dec. 10, 2007 (4 pages).
USPTO Office Action for U.S. Appl. No. 10/147,218, filed Jan. 3, 2007 (5 pages).
USPTO Office Action for U.S. Appl. No. 10/699,859, filed Sep. 19, 2007 (13 pages).
USPTO Office Action for U.S. Appl. No. 10/699,859, filed May 22, 2008 (16 pages).
USPTO Advisory Action for U.S. Appl. No. 10/699,859, filed Jul. 3, 2008 (3 pages).
USPTO Office Action for U.S. Appl. No. 10/715,081, filed Mar. 3, 2008 (16 pages).
USPTO Advisory Action for U.S. Appl. No. 10/715,081, filed Mar. 28, 2008 (3 pages).
USPTO Office Action for U.S. Appl. No. 10/715,081, filed Apr. 30, 2008 (16 pages).
USPTO Office Action for U.S. Appl. No. 11/080,322, filed Jul. 25, 2008 (16 pages).
USPTO Notice of Allowance for U.S. Appl. No. 11/126,781, filed Aug. 9, 2007 (4 pages).
USPTO Office Action for U.S. Appl. No. 10/699,858, Feb. 25, 2008 (8 pages).
U.S. Appl. No. 09/553,423, filed Apr. 19, 2000, Fraser et al.
U.S. Appl. No. 11/947,231, filed Nov. 29, 2007, Fraser et al.
U.S. Appl. No. 11/947,285, filed Nov. 29, 2007, Fraser et al.
U.S. Appl. No. 11/947,347, filed Nov. 29, 2007, Fraser et al.
U.S. Appl. No. 10/829,119, filed Apr. 20, 2004, Fraser, et al.

U.S. Appl. No. 11/621,547, filed Jan. 9, 2007, Lutnick, et al.
U.S. Appl. No. 11/621,546, filed Jan. 9, 2007, Lutnick, et al.
U.S. Appl. No. 11/328,814, filed Jan. 9, 2006, Lutnick, et al.
U.S. Appl. No. 09/851,848, filed May 9, 2001, Gilbert et al.
U.S. Appl. No. 08/766,733, filed Dec. 13, 1996, Gilbert et al.
U.S. Appl. No. 09/853,661, filed May 17, 2001, Fraser et al.
U.S. Appl. No. 11/080,322, filed Mar. 15, 2005, Lutnick et al.
U.S. Appl. No. 11/760,508, filed May 8, 2007, Fraser et al.
U.S. Appl. No. 10/382,527, filed Mar. 7, 2003, Fraser et al.
U.S. Appl. No. 09/216,464, filed Dec. 18, 1998, Lutnick et al.
U.S. Appl. No. 09/294,526, filed Apr. 20, 1999, Fraser et al.
U.S. Appl. No. 10/251,717, filed Sep. 20, 2002, Lutnick et al.
Notice of Allowance for U.S. Appl. No. 10/715,081; Mar. 1, 2010; 4 pages.
USPTO Office Action for U.S. Appl. No. 11/328,814, Apr. 10, 2009; 9 pages.
U.S. Appl. No. 10/699,858, filed Oct. 31, 2003, Lutnick et al.
U.S. Appl. No. 10/715,081, filed Nov. 17, 2003, Langridge.
U.S. Appl. No. 10/759,957, filed Jan. 16, 2004, Langridge.
U.S. Appl. No. 10/699,859, filed Oct. 31, 2003, Lutnick et al.
U.S. Appl. No. 11/126,781, filed May 10, 2005, Lutnick et al.
U.S. Appl. No. 11/856,159, filed Sep. 17, 2007, Lutnick et al.
U.S. Appl. No. 12/051,708, filed Mar. 19, 2008, Lutnick et al.
USPTO Office Action for U.S. Appl. No. 10/699,858, May 6, 2009; 8 pages.
USPTO Office Action for U.S. Appl. No. 11/621,546, May 5, 2009; 17 pages.
USPTO Office Action for U.S. Appl. No. 10/759,957, Feb. 2, 2009; 20 pages.
MAOI Technologies Announces IIVEeXCHANGE 2.1, PR Newswire, New York, Sep. 14, 1998, p. 1. Retrieved from ProQuest.
Australian Examiners Report for AU Application No. 2007204680; 5 pages; Dec. 5, 2008.
Enabling the "Disabled": Technologies for People with Handicaps. Wagner, Cynthia G. The Futurist. Washington: May/Jun. 1992. vol. 26, Iss. 3; p. 29, 4.
Datadesk Ships Switchboard; First User-Configurable Keyboard for Both IBM PCs and Macintosh Computers, Allows Users to Customize Keyboard, Add Input Devices. Brehm, Michaela, Jaker, Claudia. Business Wire. New York: Jun 26, 1990. Sec. 1. p. 1.
Datadesk's User-Configurable Keyboard Allows Users to Customize Layout, Add Input Devices. Jaker, Claudia, Brehm, Michaela. Business Wire. New York: Apr 3, 1990. Sec. 1. p. 1.
USPTO Office Action for U.S. Appl. No. 10/699,858, Dec. 15, 2008 (6 pages).
USPTO Examiner Interview Summary for U.S. Appl. No. 10/699,858, Oct. 5, 2009 (3 pages).
USPTO Office Action for U.S. Appl. No. 10/699,859, Jun. 25, 2009 (17 pages).
AU Examiner Report for AU Application No. 2005208492; 5 pages; Nov. 20, 2009.
Notice of Allowance for U.S. Appl. No. 11/621,546; 7 pages; Jan. 12, 2010.
USPTO Pre-Brief Appeal Conference Decision for U.S. Appl. No. 10/699,858, Dec. 9, 2009 (2 pages).
USPTO Office Action for U.S. Appl. No. 10/699,858, Apr. 12, 2010 (8 pages).
"Neovest Updates Trade Execution", Neovest High Performance Trading Technology, Aug. 31, 2001, http://www.neovest.com/recentarticles/article2001831.html (printed Mar. 2, 2004).
Flood, Mark D. "Microstructure Theory and the Foreign Exchange Market", Federal Reserve Bank of St. Louis Review, Nov.-Dec. 1991, vol. 73, No. 6, p. 52(10), retrieved from DIALOG Gale Group Trade and Industry DB, Dialog No. 05586898.
PCT Notification of Transmittal of International Search Report and the Written Opinion of the International Searching Authority, or the Declaration for International Application No. PCT/US02/18539, May 5, 2003.
Photographs of eSpeed, Inc. trading keyboard, May 9, 2004.
Photographs of second eSpeed, Inc. trading keyboard, May 9, 2004.
Levitt, Mark 1996. New PanoView 600 brings big images to small spaces and modular systems. Business Wire Oct. 2, 1996. http://www.proquest.com/ (accessed Jul. 22, 2008).
"Aurora", Chicago Board of Trade, 1990.
*eSPEED, Inc. et al.* v. *Brokertec USA, L.L.C. et al*. D. Del. Civil Action No. 03-612(KAJ)—PTS Client v1.1 Beta H:1—Mar. 1998 (Exhibits 118-120).
USPTO Office Action for U.S. Appl. No. 08/766,733, May 21, 1998.
USPTO Notice of Allowance for U.S. Appl. No. 08/766,733, Sep. 1, 1998.
USPTO Office Action for U.S. Appl. No. 10/147,218, Dec. 10, 2007 (4 pages).
USPTO Office Action for U.S. Appl. No. 10/147,218, Jan. 3, 2007 (5 pages).
Notice of Acceptance for AU Application No. 2005208492; Aug. 10, 2011; 2 pages.
Second Examination Report for Application No. 2010214769; Jun. 22, 2011; 2 pages.
Notice of Allowance for U.S. Appl. No. 11/215,236 dated Jul. 29, 2011; 9 pages.
EP Office Action for Application No. 03256926.1 dated Aug. 16, 2010; 6 pages.
EP Office Action for Application No. 05252856.9; 9 pages; Aug. 10, 2006.
Notice of Allowance for U.S. Appl. No. 11/215,236 dated Mar. 29, 2011; 25 pages.
Notice of Allowance for U.S. Appl. No. 10/699,859, Apr. 4, 2011; 17 pages.
USPTO Office Action for U.S. Appl. No. 12/335,951; 5 pages.
USPTO Office Action for U.S. Appl. No. 10/699,858, Mar. 21, 2011; 12 pages.
Notice of Allowance for U.S. Appl. No. 10/759,957 dated Feb. 3, 2011; 7 pages.
U.S. PTO Office Action for U.S. Appl. No. 12/051,708; Jan. 19, 2011; 9 pages.
AU Examiner Report for AU Application No. 2005208492; 3 pages; Feb. 28, 2011.
Notice of Allowance for U.S. Appl. No. 11/621,547 dated Mar. 29, 2011; 7 pages.
Notice of Allowance for U.S. Appl. No. 11/621,547 dated Jul. 9, 2010; 19 pages.
Notice of Allowance for U.S. Appl. No. 11/328,814; 20 pages; Apr. 27, 2011.
AU Examiner Report for AU Application No. 2010214769; 2 pages; Apr. 7, 2011.
Notice of Allowance for U.S. Appl. No. 11/621,546; 10 pages; Mar. 29, 2011.
"*Specialist* vs. *Saitori*: Market-Making in New York and Tokyo"; Lindsey, Richard R., Schaede, Ulrike. Financial Analysts Journal. Charlottesville: Jul./Aug. 1992. vol. 48, Iss. 4; p. 48, 10 pgs.
"Lowering exposure to counterparty failure;" Julio Bucatinsky. Wall Street & Technology. New York: Jul. 1998. vol. 16, Issue 7; pg. 110, 3 pages.
"Price Quantity Strategic Market games"; Author(s): Pradeep Dubey; Econometrica, vol. 50, No. 1 (Jan. 1982), pp. 111-126.
Notice of Allowance for U.S. Appl. No. 11/215,236 dated Dec. 1, 2010; 7 pages.
Notice of Allowance for U.S. Appl. No. 11/215,236 dated Aug. 20, 2010; 8 pages.
Definition of "protocol", Merriam-Webster Online Dictionary, downloaded Aug. 11, 2010.
U.S. PTO Office Action for U.S. Appl. No. 12/335,951 dated Aug. 30, 2010; 4 pages.
U.S. Appl. No. 09/851,848 filed May 9, 2001; 17 pages.
Notice of Allowance for U.S. Appl. No. 09/851,848 dated Apr. 25, 2008; 7 pages.
PCT Search Report for PCT Application No. PCT/US02/14825 dated Feb. 25, 2003; 4 pages.
Notice of Allowance for U.S. Appl. No. 12/031,843 dated Sep. 17, 2010; 10 pages.
U.S.Appl. No. 12/031,846 filed Feb. 15, 2008; 13 pages.
PCT International Preliminary Examination Report for Application No. PCT/US02/14825 dated Dec. 13, 2005; 4 pages.
UK Examiner Report for Application No. 0326273.0 dated Jul. 23, 2004; 3 pages.

UK Examiner Report for Application No. 0326273.0 dated Jul. 11, 2005; 7 pages.
U.S. Appl. No. 12/335,951, filed Dec. 16, 2008; 16 pages.
Office Action for U.K. Application No. 0517644.1 dated Nov. 2, 2009; 5 pages.
Canadian Office Action for Application No. 2506980 dated Aug. 12, 2010; 2 pages.
U.S. PTO Office Action for U.S. Appl. No. 12/051,708 dated Apr. 30, 2010; 6 pages.
AU Examiner Report for AU Application No. 2007204680; 4 pages; Aug. 11, 2010.
EP Office Action for Application No. 07710023.8; 6 pages, Jul. 5, 2010.
Notice of Allowance for U.S. Appl. No. 11/328,814; 7 pages; Aug. 11, 2010.
U.S. Appl. No. 11/215,236 filed Aug. 30, 2005; 31 pages.
Notice of Allowance for U.S. Appl. No. 11/215,236 dated Sep. 1, 2010; 31 pages.
Office Action for U.S. Appl. No. 11/215,236 dated Nov. 24, 2006; 15 pages.
Anderson et al.: Hedging with a put option, Texas Agricultural Extension Services, The Texas A&M University System, Jun. 1998, pp. 1-4.
Netessine, S.: Dynamic pricing of inventory/capacity with infrequent price changes, The Wharton Schook, University of Pennsylvania, Sep. 2003, pp. 1-32.
Decision for U.K. Application No. 0517644.1 dated Nov. 19, 2010; 17 pages.
U.S. Appl. No. 12/051,708 filed Mar. 19, 2008; 16 pages.
Notice of Allowance for U.S. Appl. No. 10/715,081; Feb. 3, 2011; 8 pages.
Notice of Allowance for U.S. Appl. No. 10/715,081; 9 pages.
JP Office Action for JP Application No. 2006-549572; May 18, 2010; 9 pages (includes English Translation).

* cited by examiner

| 2Y | 205 | | | | 19 | 16^ |
|---|---|---|---|---|---|---|
| ▶ 1.25 05/05 ◇ | | 99.256- 99.26 ◇ | | 38x24 | 10 | 5^ |
| 99.256 ↓ | | 99.25+- 99.262 | | 5x5 | 8 | 2 |
| L99.26 | | 99.252- 99.26+ | | 5x10 | 1 | 1 |
| OLD▽ 1.62 04/05 | ◇ | 100.182-100.186 | | 15x15 | | |
| | | 100.180-100.19 | | 5x1 | | |
| | ◇ | 100.172-100.19+ | ◇ | 15x10 | | |
| ROL▷ 405/2Y | | 100.18+-100.185 | | 15x5 | g2.87/ | p3.08 |
| 2BK▷ 1.62 03/05 | | 100.19 -100.19+ | | 10x10 | | |
| CUR▷ 02Y/3Y | 215 | | | | | |
| BAS▷ 2Y/U03 EDB | | | | | | |
| CTD▷ 305/JUN 03 | | | | | | |
| FUT▶ 2Y Sep 03 | | 108017- 108020 | | 1x25 | | |

210

| 2Y | | | 19 | 16^ |
|---|---|---|---|---|
| ▶ 1.25 05/05 ◇ | 99.256- 99.26 ◇ | 38x24 | 10 | 5^ |
| 99.256 ↓ | 99.25+- 99.262 | 5x5 | 8 | 2 |
| L99.26 | 99.252- 99.26+ | 5x10 | 1 | 1 |
| OLD 1.62 04/05 ◇ | 100.182-100.186 ◇ | 15x15 | | |
| ROL 405/2Y | 100.18+-100.185 | 15x5 | g2.87/ | p3.08 |
| 2BK 1.62 03/05 | 100.19 -100.19+ | 10x10 | | |
| CUR 02Y/3Y | | | | |
| BAS 2Y/U03 EDB | | | | |
| CTD 305/JUN 03 | | | | |
| FUT▶ 2Y Sep 03 | 108017- 108020 | 1x25 | | |

| 2Y | | | 19 | 16^ |
|---|---|---|---|---|
| ▶ 1.25 05/05 ◇ | 99.256- 99.26 ◇ | 38x24 | 10 | 5^ |
| 99.256 ↓ | 99.25+- 99.262 | 5x5 | 8 | 2 |
| L99.26 | 99.252- 99.26+ | 5x10 | 1 | 1 |
| OLD 1.62 04/05 ◇ | Font | 15x15 | | |
| ROL 405/2Y | Quad Layout ▶ | 15x5 | g2.87/ | p3.08 |
| 2BK 1.62 03/05 | | 10x10 | | |
| CUR 02Y/3Y | ✓ US Treasuries (Benchmarks) | | | |
| BAS 2Y/U03 EDB | US Treasuries (Specific) | | | |
| CTD 305/JUN 03 | US Treasuries | | | |
| FUT▶ 2Y Sep 03 | Change Instrument | 1x25 | | |

| 2Y | | | | 19 | 16^ |
|---|---|---|---|---|---|
| ▶ 1.25 05/05 ◇ | 99.256- 99.26 ◇ | 38x24 | | 10 | 5^ |
| 99.256 ↓ | 99.25+- 99.262 | 5x5 | | 8 | 2 |
| L99.26 | 99.252- 99.26+ | 5x10 | | 1 | 1 |
| OLD  1.62 04/05 ◇ | 100.182-100.186 ◇ | | | | |
| ROL  405/2Y | 100.18+-100.185 | | | | |
| 2BK  1.62 03/05 | 100.19 -100.19+ | | | | |
| CUR  02Y/3Y | | | | | |
| BAS  2Y/U03 EDB | | | | | |
| CTD  305/JUN 03 | | | | | |
| FUT ▶ 2Y Sep 03 | 108017- 108020 | | | | |

2 YEAR OLDS

| | Name | Description |
|---|---|---|
| ☐ | usg-102Y | 1.625  4/05 |
| ☒ | usg-202Y | 1.625  3/05 |
| ☐ | usg-302Y | 1.500  2/05 |
| ☐ | usg-402Y | 1.625  1/05 |
| ☐ | usg-502Y | 1.750  12/04 |
| ☐ | usg-602Y | 2.000  11/04 |
| ☐ | usg-702Y | 2.125  10/04 |
| ☐ | usg-802Y | 1.875  9/04 |
| ☐ | usg-902Y | 2.125  8/04 |

[ SELECT ] [ CANCEL ]

| 2Y | | | | | 19 | 16^ |
|---|---|---|---|---|---|---|
| ▶ 1.25 05/05 ◇ | 99.256- 99.26 ◇ | 38x24 | | | 10 | 5^ |
| 99.256 ↓ | 99.25+- 99.262 | 5x5 | | | 8 | 2 |
| L99.26 | 99.252- 99.26+ | 5x10 | | | 1 | 1 |
| OLD  1.62 03/05 | 100.19-100.19+ | 15x15 | | | | |
| ROL  405/2Y | 100.18+-100.185 | 15x5 | g2.87/ | p3.08 | | |
| 2BK  1.62 03/05 | 100.19 -100.19+ | 10x10 | | | | |
| CUR  02Y/3Y | | | | | | |
| BAS  2Y/U03 EDB | | | | | | |
| CTD  305/JUN 03 | | | | | | |
| FUT ▶ 2Y Sep 03 | 108017- 108020 | 1x25 | | | | |

CUSTOMIZABLE TRADING DISPLAY OF MARKET DATA

RELATED APPLICATIONS

This application is a continuation-in-part of U.S. application Ser. No. 10/715,081 filed Nov. 17, 2003, entitled "Customizable Trading Display Of Market Data," currently pending.

TECHNICAL FIELD

This disclosure relates generally to the field of data processing and, more specifically, to a customizable trading display of market data.

BACKGROUND

Trading systems include one or more workstations that present expanded market data to traders and allow them to offer bids or sales for various financial instruments based on the presented market data. Contemporary trading systems attempt to provide traders with up-to-date market data based on the trader's particular requirements. These trading systems normally are configured prior to or during installation on the trader's workstation. Often, the configurations are static or unchangeable, thereby providing the trader with a fixed display presenting expanded market data.

SUMMARY

This disclosure provides a system and method for providing a customizable trading display of market data. In one embodiment, the method includes selecting a subset from a plurality of quadrants, with each quadrant associated with one benchmark instrument and each benchmark instrument associated with one or more non-benchmark instruments. Market data is automatically retrieved for the instruments associated with each selected quadrant. A customizable trading display is generated, with the display comprising the subset of quadrants in a selectable layout and each quadrant presenting the associated market data.

In another embodiment, the method further includes receiving a selection of a new benchmark instrument from one of the selected quadrants. A replacement quadrant is selected from the plurality of quadrants, the replacement quadrant associated with the new benchmark instrument. Market data is automatically retrieved for the instruments associated with the replacement quadrant. The customizable display is then updated based on the replacement quadrant, the replacement quadrant including the new market data.

In yet another embodiment, each instrument comprises a market depth and the method further includes generating each quadrant based on a default market depth for each associated instrument. The current market depth of one instrument is updated in response to receiving a market depth update request, the market depth update request comprising a market depth value different from the current market value of the instrument to be updated. The quadrant associated with the updated instrument is then expanded based on the updated market depth. Another quadrant associated with the first quadrant is selected and expanded to match a size of the first quadrant. Then, the remaining quadrants are scaled to maintain a size of the customizable trading display.

In a further embodiment, the method for providing a customizable trading display of market instrument data includes selecting a subset from a plurality of quadrants, with each quadrant associated with one benchmark instrument and each benchmark instrument associated with one or more non-benchmark instruments. Market data is automatically retrieved for the instruments associated with each selected quadrant. A customizable trading display is generated with the display comprising the subset of quadrants in a selectable layout and each quadrant presenting the associated market data.

The invention has several important technical advantages. Various embodiments of the invention may have none, some, or all of these advantages. One advantage of the present invention is that it provides a trading display that may be customized according to a trader's needs or wishes. These customizations may occur at run-time to allow the trader to dynamically filter market data or expand on the market data currently presented. Further, the present invention may provide a scaleable display that incorporates the trader's customizations without requiring resizing of the entire display or loss of content. Moreover, the present invention may present an administrator or manager with the ability to limit certain views or customizations of the trading display using a configuration file. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

DESCRIPTION OF EXAMPLE EMBODIMENTS

Figure 1:
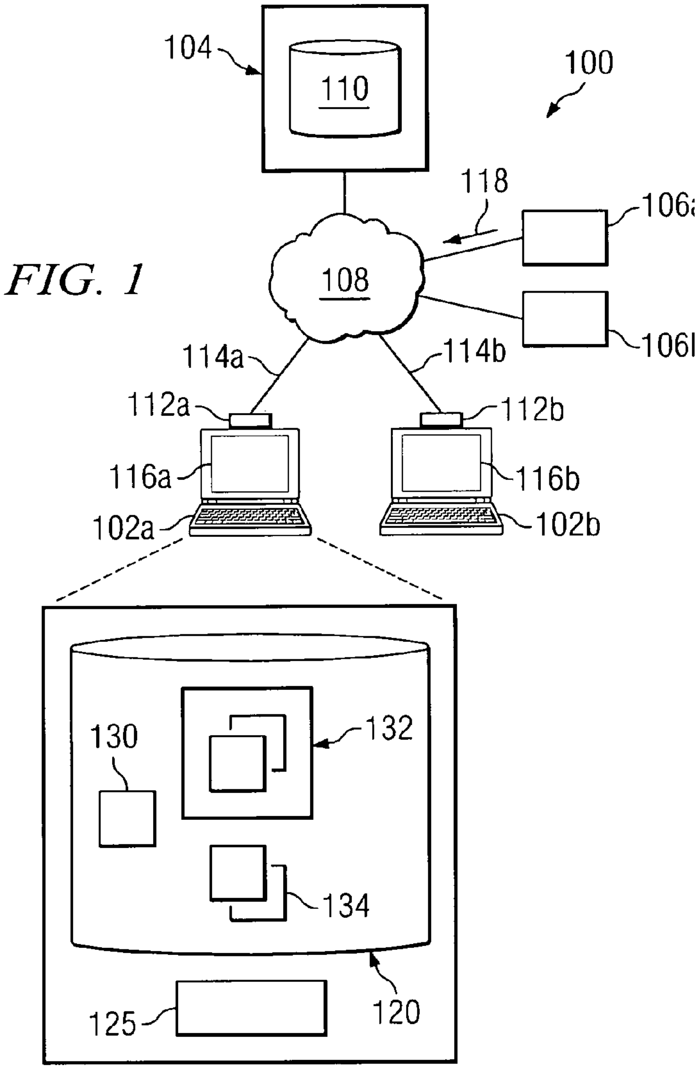
FIG. 1 illustrates an example trading system for providing a customizable trading display of market data in accordance with one embodiment of the present disclosure.

FIG. 1 is a block diagram illustrating a trading system 100 including one or more customizable trading displays 116 according to one embodiment of the present disclosure. At a high level, trading system 100 is a client/server environment comprising at least one client 102, a server 104, and one or more data providers 106, but may also be a standard computing environment or any other suitable environment. In general, trading system 100 comprises a system for providing a trader, or other user of client 102, with the ability to customize trading display 116 of market data 118, normally received from one data provider 106 and stored in a central repository 110 on server 104. For example, trading system 100 may comprise a market system that compiles U.S. Treasury benchmark and non-benchmark instrument data, automatically presents the compiled instrument data to a trader via customizable display 116, and dynamically processes any appropriate customization of trading display 116 based on requests from the trader. Generally, the benchmark instrument is the most recently auctioned issue for one of the maturities. The term “automatically,” as used herein, generally means that the appropriate processing is substantially performed by at least part of trading system 100. It should be understood that “automatically” further contemplates any suitable user or trader interaction with system 100 without departing from the scope of this disclosure. The term “dynamically,” as used herein, generally means that certain processing is determined, at least in part, at run-time based on one or more variables.

Server 104 comprises any computer including a central repository 110 and communicably connected to at least one client 102 and/or one data provider 106. For example, server 104 may be a general-purpose personal computer (PC), a Macintosh, a workstation, a Unix-based computer, a server computer, or any other suitable device. FIG. 1 only provides one example of computers that may be used with the disclosure. For example, although FIG. 1 illustrates one server 104 that may be used with the disclosure, system 100 can be implemented using computers other than servers, as well as a server pool. The present disclosure contemplates computers other than general purpose computers as well as computers without conventional operating systems. As used in this document, the term “computer” is intended to encompass a personal computer, workstation, network computer, or any other suitable processing device. Computer server 104 may be adapted to execute any operating system including UNIX, Windows, or any other suitable operating system so long as server 104 remains communicably connected to client 102. According to one embodiment, server 104 may be a remote web server. In short, server 104 may comprise any computer with software and/or hardware in any combination suitable to present client 102 with market data stored in a central repository 110. Central repository 110 includes a variety of market data 118 from one or more data providers 116. Central repository 110 comprises any physical or logical description of data storage operable to be defined, processed, or retrieved by externally implemented code. For example, central repository 110 may comprise one or more extensible Markup Language (XML) tables or documents. In another example, central repository 110 may comprise a relational database described in terms of SQL statements or scripts, flat files, Btrieve files, or comma-separated-value (CSV) files. Central repository 110 may comprise a plurality of tables stored on one server 104 or across a plurality of servers 104. Moreover, central repository 110 may be local or remote without departing from the scope of this disclosure. In short, central repository 110 is any data storage comprising at least a subset of market data 118 that is communicably connected to at least one client 102.

Each client 102 is any trading workstation or device operable to present the trader with customizable trading display 116 via a graphical user interface (GUI). At a high level, illustrated client 102 includes GUI 116, memory 120 and processor 125 and comprises an electronic computing device operable to receive, transmit, process and store any appropriate data associated with trading system 100. It will be understood that there may be any number of clients 102 coupled to server 104, as illustrated by client 102*a* and client 102*b*. Further, “client 102” and “user of client 102” may be used interchangeably without departing from the scope of this disclosure. As used in this document, client 102 is intended to encompass a personal computer, workstation, network computer, kiosk, wireless data port, personal data assistant (PDA), one or more processors within these or other devices, or any other suitable processing device. For example, client 102 may comprise a computer that includes an input device, such as a keypad, touch screen, mouse, or other device that can accept information, and an output device that conveys information associated with the operation of server 104 or clients 102, including digital data, visual information, or customizable display 116. Moreover, client 102 may comprise a keyboard customized to match one particular trading display 116, with each key mapped to a particular frame, view, or functionality of trading display 116. Both the input device and output device may include fixed or removable storage media such as a magnetic computer disk, CD-ROM, or other suitable media to both receive input from and provide output to users of clients 102 through the customizable trading display, namely GUI 116.

GUI 116 comprises a graphical user interface operable to allow the user of client 102 to interface with system 100 to receive one or more sets of market data, each from one data provider 106. Generally, GUI 116 provides the user of client 102 with an efficient and user-friendly presentation of data provided by trading system 100. GUI 116 may comprise a plurality of customizable frames or views having interactive fields, pull-down lists, and buttons operated by the user. In one embodiment, GUI 116 presents a trading display that presents the various market data feeds and receives commands from the user of client 102 via one of the input devices. As illustrated in more detail in FIG. 2A, according to certain embodiments, trading display 116 includes trading grids, trading quads or quadrants 134, a command line, and a ticker. As illustrated in more detail in FIGS. 6A-D, quadrants 134 may be presented in one of a plurality of selectable layouts such as, for example, 1×6, 2×3, 3×2, or 6×1. These layouts are examples only and any suitable layout, with any numbers of quadrants 134, are within the scope of this disclosure. Moreover, it should be understood that the term graphical user interface may be used in the singular or in the plural to describe one or more graphical user interfaces and each of the displays of a particular graphical user interface.

Trading display 116 may also be associated with a configuration file, module, or dynamic link library (DLL) operable to store various dynamically configurable or selectable options and parameters. For example, the parameters may include restricting movement of one or more quadrants 134, restricting resizing of trading display 116, setting minimum height of each quadrant 134, and restricting at least one of the selectable layouts, such as not allowing the trader to select the example 1×6 layout, while allowing the other examples. This configuration component may be a distributed file that is managed by an administrator or manager, thereby providing centralized and consistent configuration for a plurality of traders. It will be understood that administrator as used herein is any user or trader with permissions or rights to dynamically configure options for trading display 116. In other words, each trader may also be an administrator without departing from the scope of this disclosure. These parameters may be configured during run-time to allow for swift responses to changing trading, regulatory, or other industry conditions. In short, trading display 116 contemplates any graphical user interface, such as a generic web browser, that processes information in system 100 and efficiently presents the information to the user. Server 104 can accept data from client 102 via the web browser (e.g., Microsoft Internet Explorer or Netscape Navigator) and return the appropriate HTML or XML responses using network 108.

Network 108 facilitates wireless or wireline communication between computer server 104 and any other computer.

Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations. Client 102 includes interface 112 for communicating with other computer systems, such as server 104, over network 108 in a client-server or other distributed environment. In certain embodiments, client 102 receives market data 118 from network 108 for storage in memory 120. Generally, interface 112 comprises logic encoded in software and/or hardware in a suitable combination and operable to communicate with network 108 via link 114. More specifically, interface 112 may comprise software supporting one or more communications protocols associated with communications network 108 or hardware operable to communicate physical signals.

Memory 120 may include any memory or database module and may take the form of volatile or non-volatile memory including, without limitation, magnetic media, optical media, random access memory (RAM), read-only memory (ROM), removable media, or any other suitable local or remote memory component. In the illustrated embodiment, memory 120 includes at least trade application 130, local market data 132, and quadrants 134, but may also include any other appropriate data, such as a configuration file for use by trading display 116 and trade application 130.

Trade application 130 could include any hardware, software, firmware, or combination thereof operable to receive and process market data 118 and present it to the trader through customizable trading display 116. When loading or configuring trading display 116, trade application 130 may first process the configuration file, whether local or remote, to determine the initial or allowable layout and customizable parameters. Further, trade application 130 may receive and process customization requests from the trader using client 102 via trading display 116. But trade application 130 may deny, ignore, or communicate an error in response to certain customization requests based on the configuration file. It will be understood that while trade application 130 is illustrated as a single multi-tasked module, the features and functionality performed by these engine may be performed by multiple modules such as, for example, a data retrieval module and a presentation engine. Moreover, trade application 130 may comprise a child or sub-module of another software module without departing from the scope of this disclosure. In short, trade application 130 comprises one or more software modules operable to provide any appropriate backend processing for customizable trading display 116.

Local market data 132 stores one or more subsets of remote market data 118, such as benchmark and non-benchmark instruments. Local market data 132 may receive a copy of market data 118 through interface 112 or from another process running on client 102 as appropriate. As appropriate, local market data 132 may automatically, dynamically, or manually retrieve or receive market data 188 from central repository 110 at any appropriate time. For example, trading application 130 may automatically retrieve a copy of market data 118 in central repository 110 upon initial execution. Further, local market data 132 may be of any suitable format including XML documents, flat files, comma-separated-value (CSV) files, SQL tables, relational database tables, and any other format operable to store at least one subset of market data 118. It will be understood that local market data 132 may be in a format different from central repository 110 or communicated market data 118 so long as it is compatible with trading display 116 and may be processed by trading application 130.

Trading display 116 includes a number of quadrants 134 selected from a plurality of quadrants 134 stored in memory 120. Each quadrant 134 is operable to display expanded trading information associated with one benchmark instrument. But quadrants 134 may present any level of trading or financial details. For example, one quadrant 134 may be customized to display expanded information from an instrument associated with a second quadrant 134. Each quadrant 134 may also include one or more non-benchmark instruments that may be selected, for example, in response to the trader pressing one of the issue keys on the keyboard. One quadrant 134 may also provide the trader with the ability to obtain trading information for each of the related U.S. Treasury swaps, off-the-runs, yield curve U.S. Treasury swaps, basis, or any other appropriate benchmark instrument.

Client 102 also includes processor 125. Processor 125 executes instructions and manipulates data to perform the operations of client 102 such as, for example, a central processing unit (CPU), an application specific integrated circuit (ASIC) or a field-programmable gate array (FPGA). Although FIG. 1 illustrates a single processor 125 in client 102, multiple processors 125 may be used according to particular needs, and reference to processor 125 is meant to include multiple processors 125 where applicable. In certain embodiments, processor 125 executes one or more processes associated with trade application 130 to present market data 118 communicated from central repository 110 via data providers 106.

Data provider 106 typically comprises a third party web server or an enterprise agent residing on a machine operable to communicate at least a portion of market data 118 for storage in central repository 110. It will be understood that data provider 106 may be remote or on-site; further, data provider 106 may represent a separate process running on server 104 or client 102 without departing from the scope of this disclosure. Generally, data provider 106 is any hardware, software, or logic operable to provide trading system 100 with at least a subset of any appropriate market data 118. Trading system 100 may comprise any number of data providers 106, as illustrated by data providers **106*a* and 106*b*, as long as central repository 110 includes at least a portion of desired market data 118. For example, a plurality of data providers 106 may be communicably daisy-chained off a master provider 106. Master data provider 106 may compile and verify substantially all of market data 118 and communicate the compiled market data 118 to server 104** upon request or at a scheduled time.

In one aspect of operation, trading application 130 is executed and initialized either automatically, such as when client 102 is powered up, or in response to a command from the trader. Trading application 130 determines a default configuration and layout for trading display 116, retrieves the appropriate market data for the benchmark and non-benchmark instruments from central repository 110 and/or local market data 132, and generates customizable trading display 116 based on the default configuration and retrieved data. The generated trading display 116 includes a plurality of customizable quadrants 134. For example, trading display 116 allows the trader to expand the viewable market depth in at least one of quadrants 134, select and replace various instruments in quadrants 134, or any other customization according to any other appropriate criteria, subject to one or more suitable dynamically-selectable administrator options. Trading application 130 processes each customization and regenerates, or repaints, trading display 116 as appropriate.

Figure 2B:
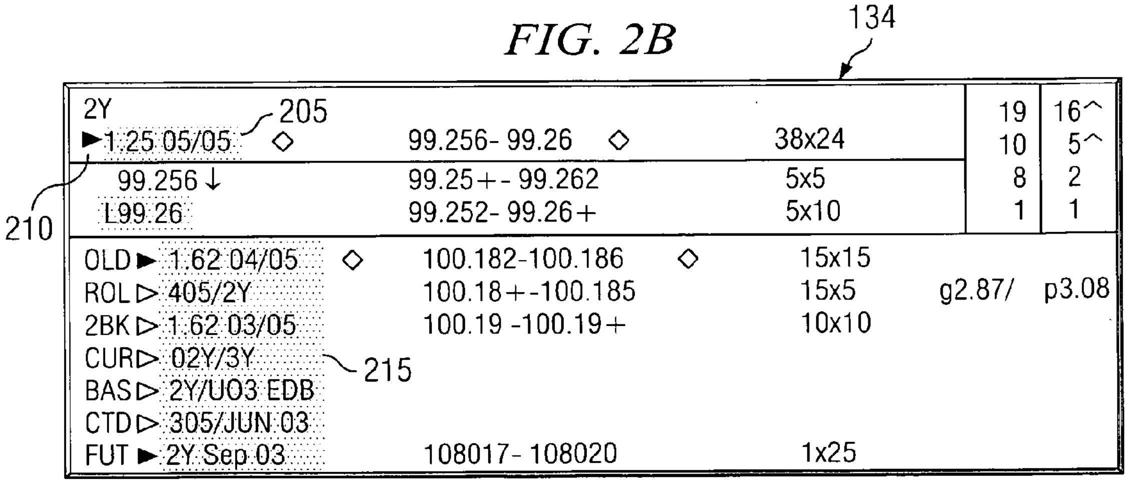
FIGS. 2B-C illustrate example trading quadrants with expandable market depth in accordance with the system in FIG. 1.
Figure 2A:
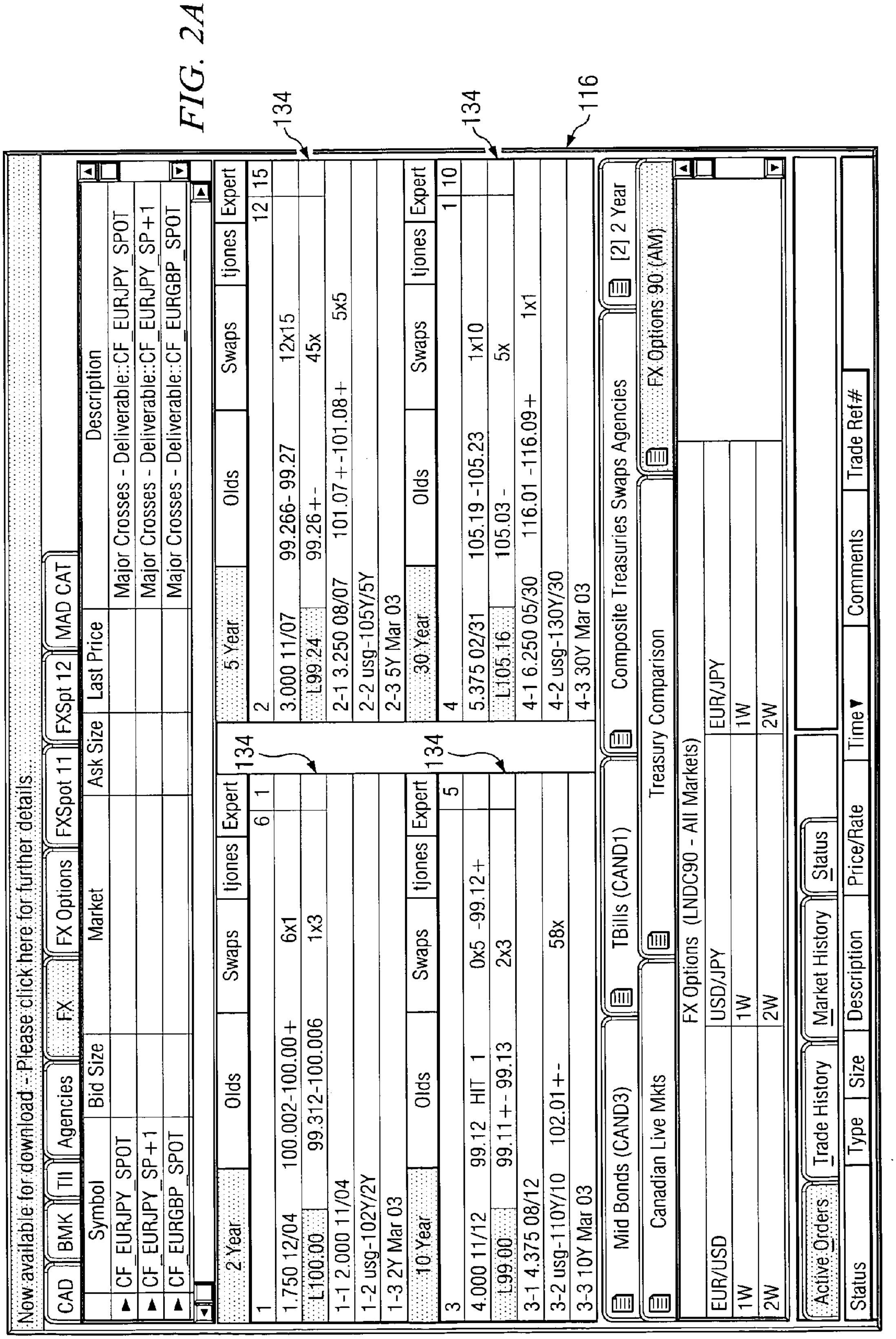
FIG. 2A illustrates an example trading display as might be presented by the trading system of FIG. 1.

FIG. 2A illustrates example customizable trading display 116. Illustrated trading display 116 includes a plurality of trading grids, a plurality of trading quads or quadrants 134, a command line, and a ticker. Each trading grid presents market data and market updates on selected securities. From the trading grid, the trader can post markets and execute trades. Trading display 116 may display grids in a tabbed format or multiple panes of adjustable width. If necessary, horizontal scroll bars appear to allow the user to navigate the grid. Further, each row can be expanded to display the bid/offer list by selecting the arrow on the left of each row in a grid. Trading display 116 includes one or more customizable quadrants 134 based on one of the cells in the grid. Each quadrant 134 is typically associated with a default layout determined at initialization of trading application 130. This default layout may be dynamically configured by the trader during processing. Illustrated display 116 includes four quadrants 134. But trading display 116 may include any number of quadrants 134 so long as display 116 remains appropriate. Using quadrants 134, the trader may view the benchmark and non-benchmark instruments associated with the selected market cell. As described above, each quadrant 134 may be linked to one set of keys on the customized keyboard designating bid, offer, buy, sell, cancel bid/offer, and others. Trading display 116 may also include the command line that may be used to enter orders using the number keys and keyboard shortcuts.

Status tabs may include active orders, trade history, market history, overall application status, or any other suitable status information. The active orders window displays information on all posted markets or unexecuted orders. This window displays information on all currently outstanding bids and offers as well as information on buys and sells that have not been confirmed. Double clicking on an entry in this window will display a dialog that offers the option of canceling the selected entry. The trade history window displays information on all confirmed trades. The query trades command may be used be the trader to refresh the contents of this window and trading history settings to specify the dates that the query trades command should specify. The market history window displays information on all markets and orders rejected by the trading system. The overall application status window contains a log of communications between components of trading system 100 as well as a record of actions related to trading functions. According to certain embodiments, the contents may be communicated to a file or printer by right clicking in view 134. The ticker feature typically displays the time and selected securities on a banner that scrolls across the screen. These example graphical features are for illustration purposes only and trading display 116 comprises quadrants as well as none, some, or all of the remaining illustrative elements or alternative elements without departing from the scope of the disclosure. It will be understood that illustrated display 116 is for example purposes only and trading display 116 may comprise any appropriate graphical elements for presenting appropriate market data 118. Moreover, it will be understood that the data displayed therein is for example purposes only and any appropriate market data 118 may be displayed.

Figure 2C:
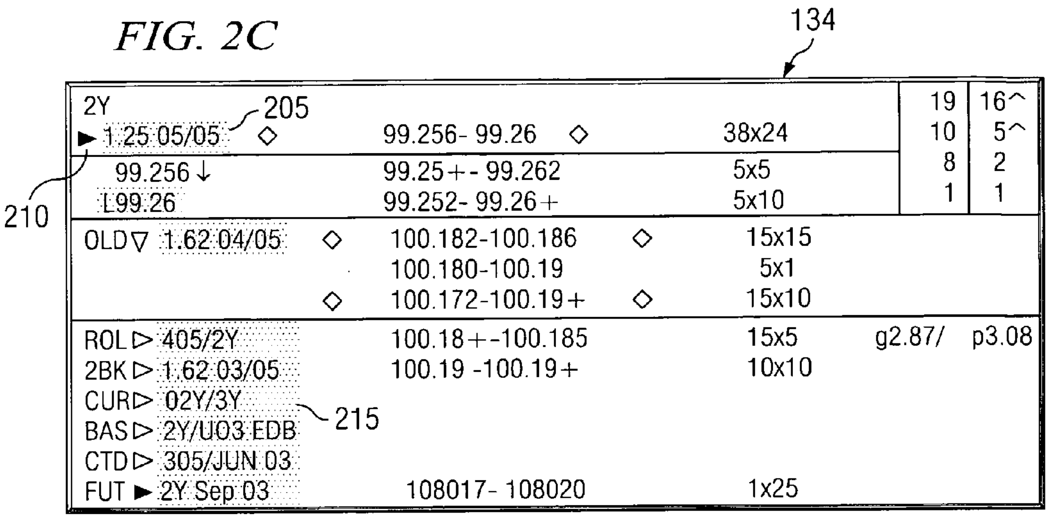

FIGS. 2B and 2C illustrate example quadrant 134 including at least one instrument with expandable market depth. Illustrated quadrant 134 is a two year U.S. Treasury expanded view including benchmark instrument 205 and a plurality of non-benchmark instruments 215. According one embodiment, quadrant 134 further includes a headline. Headline may include the price that should be initially aggressed to start a trade or the actual aggressed trade. The headline may further include the item, the price, the size, and the last price for the benchmark instrument. Quadrant 134 may include bid and offer stacks without departing from the scope of this disclosure. Bid and offer stacks may indicate the size of one or many market participants that are bidding or offering at the current price.

Under the benchmark instrument 205, trading application 130 may provide the trader with U.S. Treasury swap lock price (e.g., "L 99.26") on the benchmark instrument. U.S. Treasury swap trading relates to a chosen price movement relationship between two different instruments. Quadrant 134 may also include any other suitable trading information, such as market depth information, which shows price and size for items that have not yet been traded. Illustrated U.S. Treasury swap lock price is L 99.26. It will be understood that, for example, U.S. Treasury bonds are traded at a percentage of a bond's face value. This percentage is typically broken down into 32nds of a point and fractions thereof. Often, the displayed prices shown represent the whole number portion and the percentage being traded. For example, consider the price "99.256." The number left of the decimal point, "99", is equivalent to the whole number portion of the price and the number right of the decimal point, "256", is equivalent to the fractional portion. According to certain embodiments, some prices may have "+" in the third digit right of the decimal point. The "+" may represent 4/8th of a 32nd or half a 32nd.

Each instrument includes a market depth comprising a value between one and ten. Each instrument in quadrant 134 may further have an upper and lower limit on the market depth that may be displayed. For example, the trader may set the required upper and lower ranges within the range of one and ten. Moreover, each displayed benchmark and non-benchmark instrument is associated with one identifiable GUI element 210 such as an arrow, a plus (+) sign, or any other GUI component operable to notify the user that the instrument may or may not have market depth. For example, illustrated quadrangle 134 includes a shaded arrow 210 associated with the benchmark instrument. According to certain embodiments, shaded arrow 210 (pointing to the right) signifies that the instrument has market depth greater than one and, therefore, can be expanded. Each unshaded arrow 210 (pointing to the right) signifies that the associated instrument has no market depth, or market depth equal to one, but can be expanded. For example, if the trader clicks on arrow 210 (or presses a key or a key combination on the customized keyboard), the market depth of the instrument is displayed. The trader will be able to define the amount of depth shown when the instrument is expanded. Once expanded to the requested value, arrow 210 will typically point down, as illustrated in FIG. 2C. Typically, expanded quadrant 134 will remember the market depth layout for subsequent generation. If the market depth of one of the instruments is changed, often trading application 130 will modify the instrument at the same position in other quadrants 134 on the same row in display 116 to keep the view symmetrical. It will be understood that arrows 210 are for illustration purposes only and that any GUI element may be used without departing from the scope of the disclosure.

FIGS. 3A-D illustrate an example trading display 116 including selectable instruments in accordance with trading system 100. The illustrated data and layout thereof are similar to that in FIGS. 2B-C. As illustrated in FIGS. 3A-D, quadrant 134 provides the trader with the ability to select various instruments for display with quadrant 134. For example, the trader may select a different benchmark instrument, after which trading application 130 retrieves data for the replace benchmark instrument and all default associated non-benchmark instruments and regenerates the entire quadrant 130 based on this retrieved data. In another example, the trader may select a replacement non-benchmark instrument. In this example, trading application 130 may retrieve the data associated this instrument alone from local market data 132 or central repository 110 as appropriate. Next, trading application 130 repaints quadrant 134.

Figure 3A:
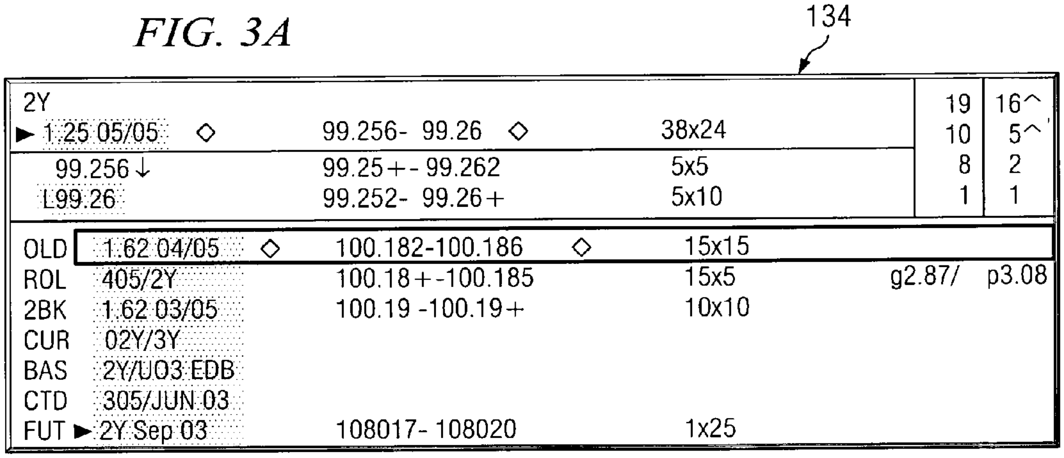
FIGS. 3A-D illustrate an example trading quadrant including selectable instruments in accordance with the system in FIG. 1.
Figure 3B:
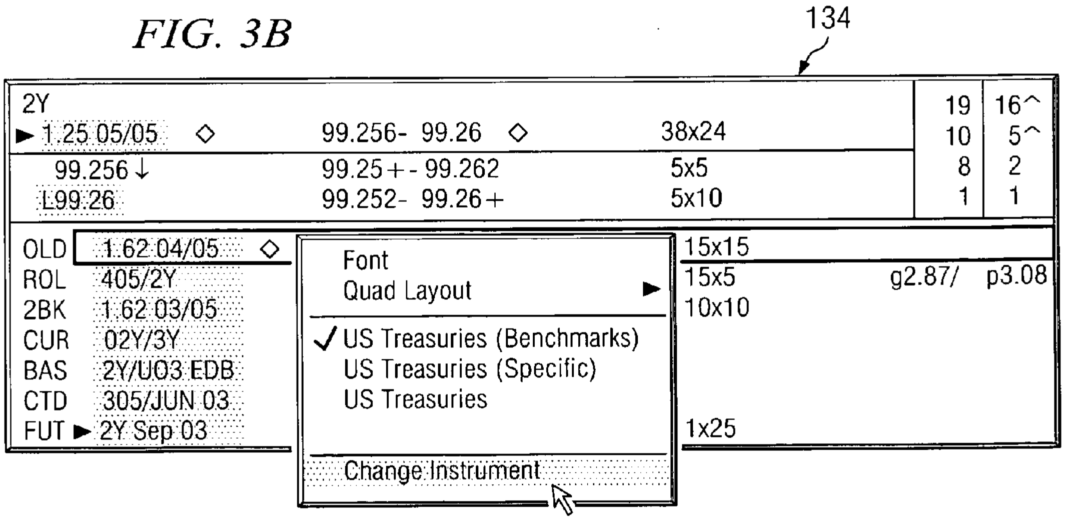
Figure 3C:
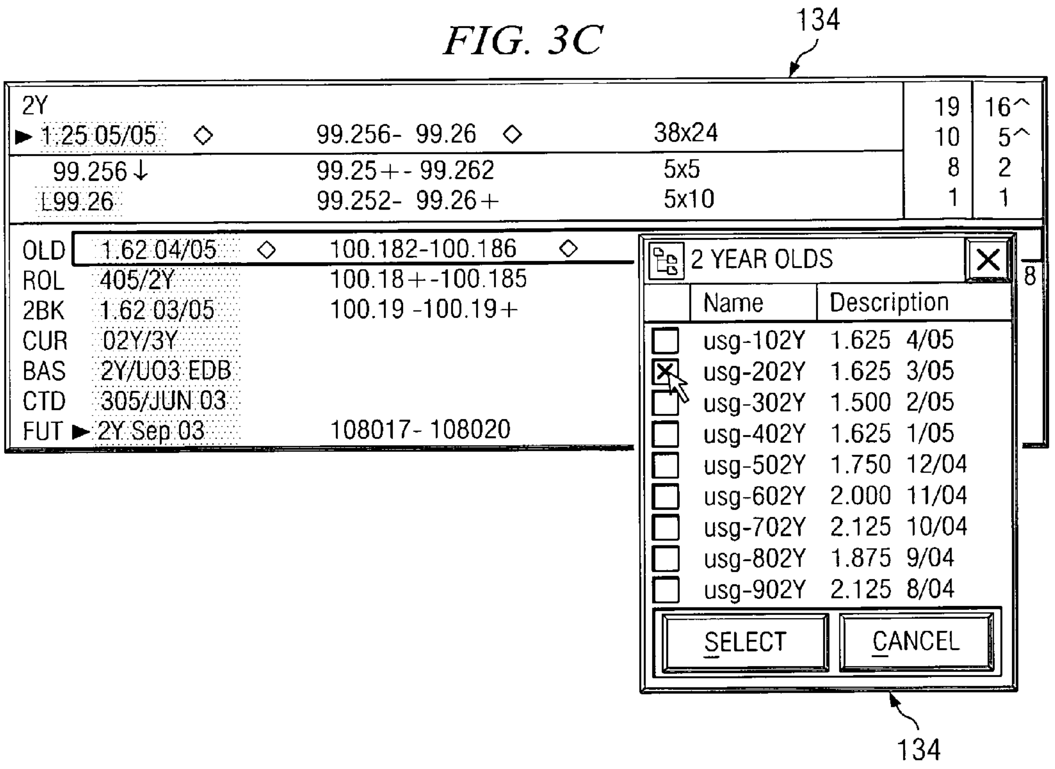
Figure 3D:
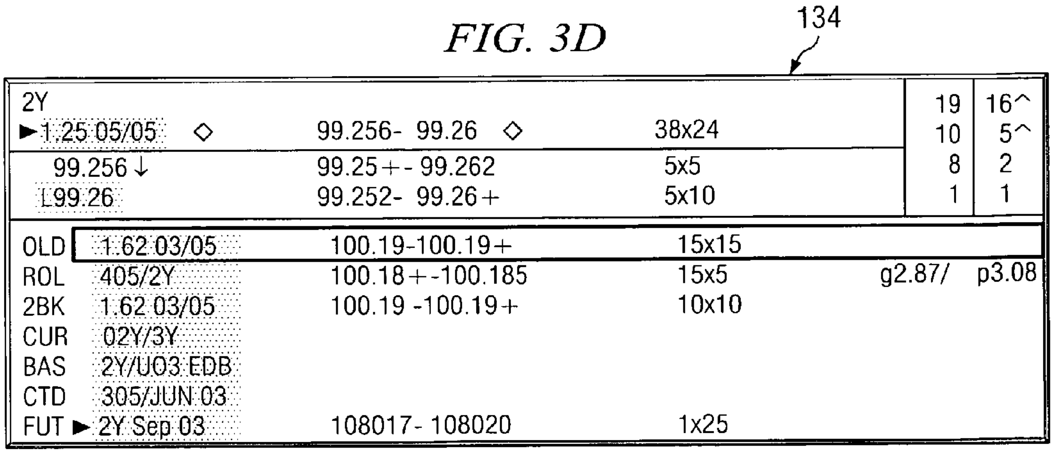

According to certain embodiments, to select a replacement instrument, the trader presses the right mouse button over the selected instrument to access a popup window, as illustrated in FIG. 3B. The trader then selects "Change Instrument" from the popup window, which then provides a list of replacement instruments. It will be understood that each changeable instrument may have a list of none, one, or more possible replacements. The trader selects one replacement instrument from the list provided. Typically, no duplicate instruments are allowed on the same quadrant 134 or display 116. Then trading application 130 regenerates or repaints the effected quadrant 134 as appropriate. But the default view of quadrant 134 may be reverted to at anytime without departing from the scope of this disclosure It will be understood that FIGS. 2B-C and 3A-D are for illustration purposes only. Each illustrates one or more example outcomes of a particular customisation technique such as, for example, expansion of market depth and selection of replacement instruments. While illustrated separately, these techniques may be implemented alternatively or in combination within one or more trading displays 116, one or more quadrants 134, or any other appropriate functional element.

Figure 4:
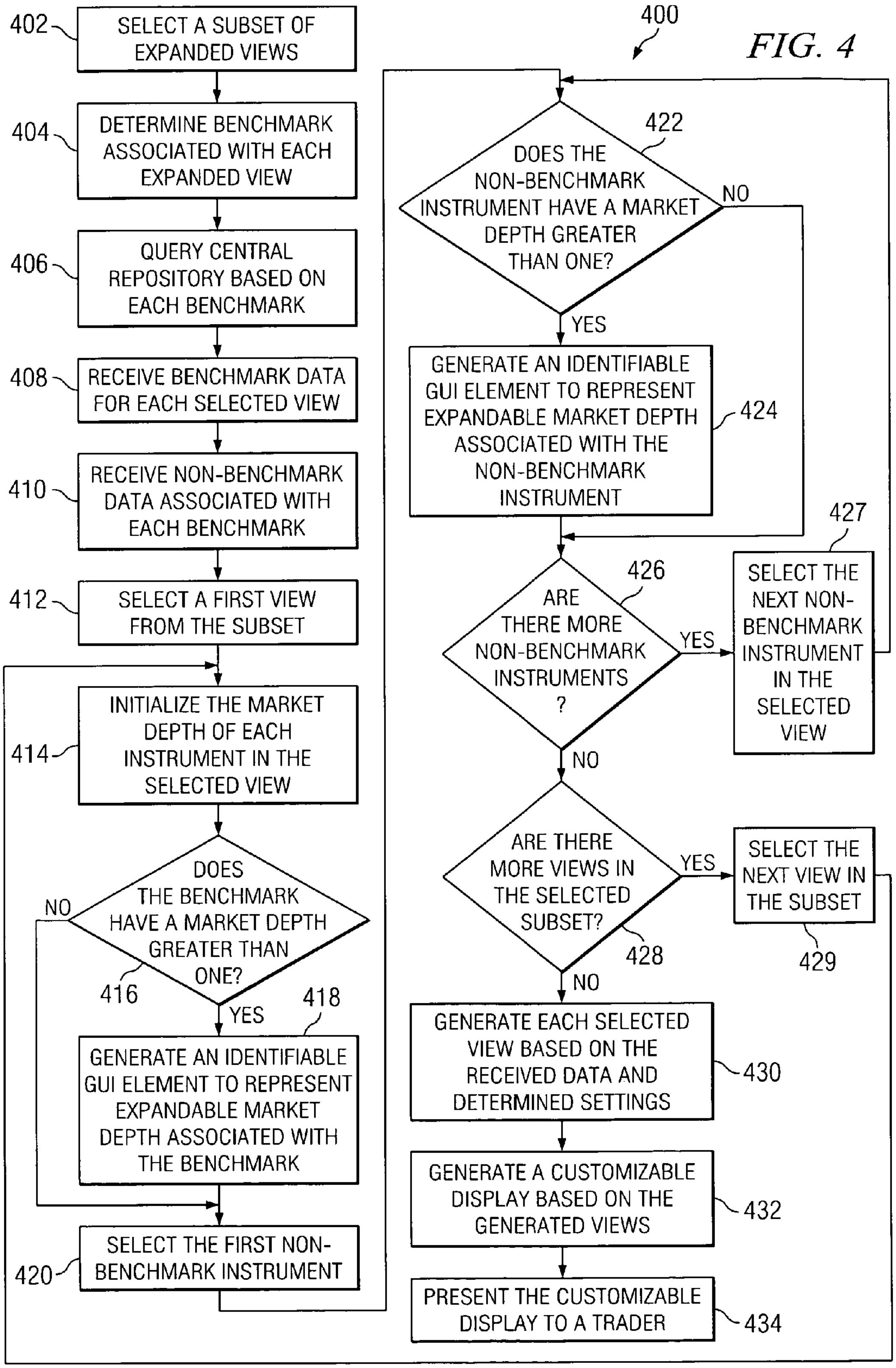
FIG. 4 is a flowchart illustrating an example method for providing a customizable trading display of market data in accordance with one embodiment of the present disclosure.

FIG. 4 is a flowchart illustrating an example method 400 for providing a customizable trading display 116 of market data in accordance with one embodiment of the present disclosure. Generally, method 400 describes trading client 102 initializing, generating, and presenting trading display 116 to a trader. Method 400 is described in respect to system 100 and trading application 130. However, any other suitable system may use appropriate embodiments of method 400 to present customizable trading display 116 to the trader without departing from the scope of this disclosure.

Method 400 begins at step 402, where trading application 130 selects a subset of quadrants 134 from memory 120. It will be understood that this selection may occur automatically through trading application 130 determining a default configuration, receiving a selection from the trader using client 102, or any other appropriate selection technique. Next, at step 404, trading application 130 associates one benchmark instrument with each selected quadrant 134. Trading application 130 then queries central repository 110 based on each determined benchmark at step 406. The query from trading application 130 may include a request for market data 118 associated with each benchmark and market data 118 for each non-benchmark instrument associated with the selected benchmark. Trading application 130 may query local market data 132 alternatively or in combination with central repository 110 at step 406. At step 408, trading application 130 receives benchmark data for each selected view from central repository 110. Trading application 130 receives non-benchmark instrument data associated with each benchmark at step 410. Once the views have been selected and the appropriate data has been compiled, trading application then generates the customizable trading display 116 in steps 414 through 434.

Trading application 130 begins generating trading display 116 by selecting a first expanded view or quadrant 134 from the selected subset at step 412. Next, at step 414, trading application 130 initializes the market depth of each instrument in the selected quadrant 134. According to certain embodiments, trading application 130 may determine the market depth based on a stored configuration, a default value, or any other appropriate parameter. Next, at decisional step 416, trading application 130 determines if the benchmark associated with the selected view 134 has an available market depth greater than one. If the benchmark has an available market depth greater than one, then trading application 130 generates an identifiable GUI element 210, such as a shaded or colored arrow or plus sign, to represent expandable market depth associated with the benchmark at step 418. Next, or if the benchmark does not have an available market depth greater than one, processing proceeds to step 420, where trading application 130 selects the first non-benchmark instrument associated with the benchmark. At decisional step 422, trading application 130 determines if the non-benchmark instrument associated with the selected view 134 has an available market depth greater than one. If the non-benchmark instrument has an available market depth greater than one, then trading application 130 generates an identifiable GUI element 210 to represent expandable market depth associated with the non-benchmark instrument at step 424.

Trading application 130 then determines if there are more non-benchmark instruments associated with the benchmark at decisional step 426. If there are more non-benchmark instruments, then trading application 130 selects the next non-benchmark instrument in the selected quadrant 134 at step 427 and processing returns to decisional step 422. Once there are no more non-benchmark instruments in the selected view 134, then processing proceeds to decisional step 428. At decisional step 428, trading application 130 determines if there are more quadrants 134 in the subset previously selected at step 402. If there are more quadrants 134, then trading application 130 selects the next view 134 in the subset and execution returns to step 414. Once all the selected quadrants 134 have been initially processed, then trading application 130 generates or paints each selected quadrant 134 at step 430 based on market data received in steps 408 and 410 and the settings determined in steps 414 through 424. Next, at step 432, trading application 130 generates customizable display 116 based on the generated views. Once the customizable trading display 116 has been generated, trading application 130 presents trading display 116 to a trader or other appropriate user of client 102.

Figure 5A:
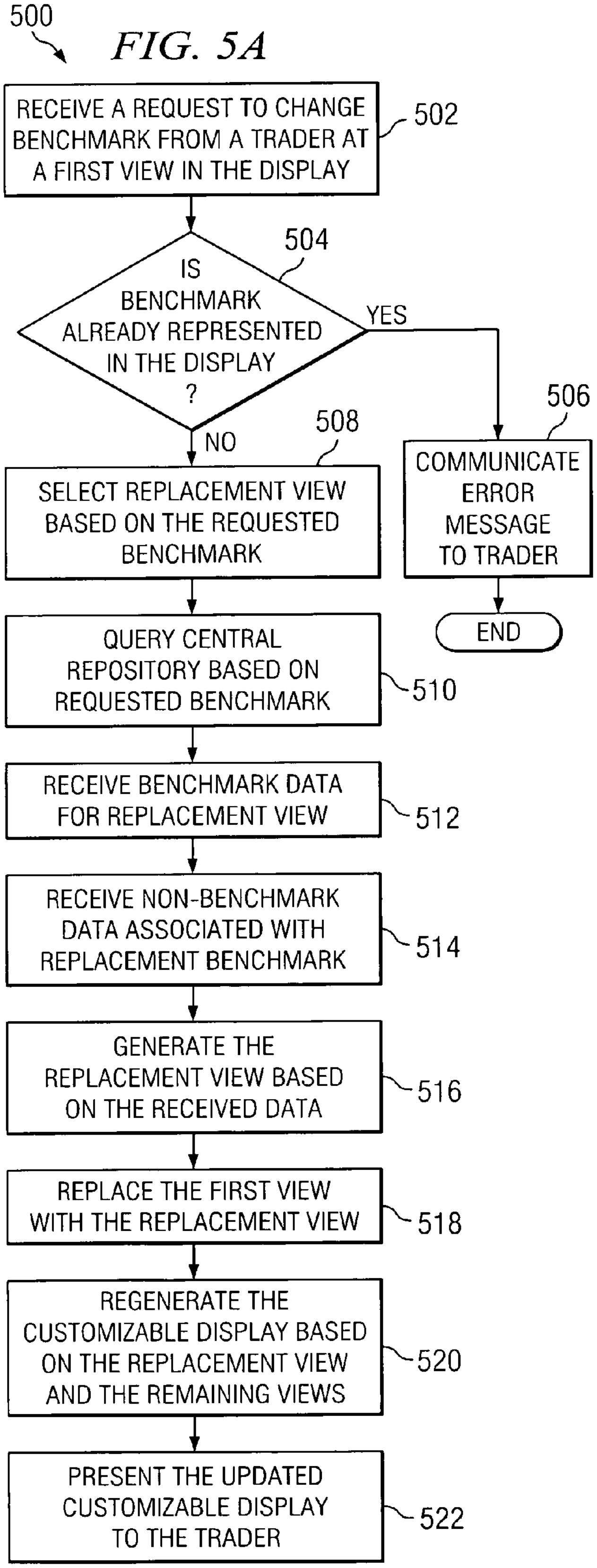
FIGS. 5A-B are flowcharts illustrating example methods of processing dynamic customizations to the trading display by a trader.
Figure 5B:
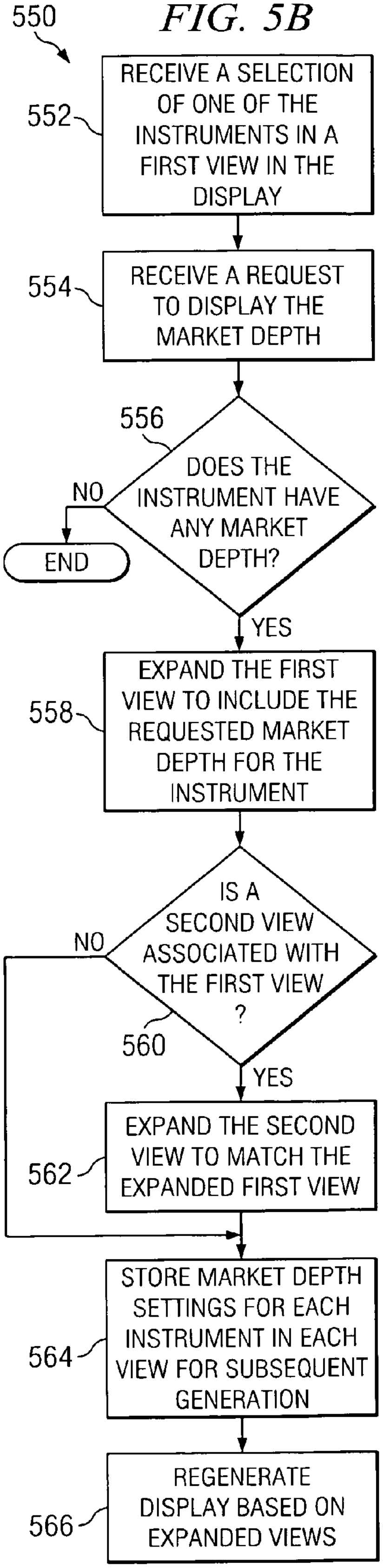

FIGS. 5A-B are flowcharts illustrating example methods 500 and 550 for processing dynamic customizations to trading display 116 by a trader. Generally, methods 500 and 550 describes trading client 102 receiving customization requests from the trader, processing any suitable customizations, and presenting an updated trading display 116 based upon the processed customizations. Methods 500 and 550 are described in respect to trading system 100. However, any other suitable system may use different embodiments of methods 500 and 550 to customize trading display 116 without departing from the scope of this disclosure.

FIG. 5A illustrates an example method 500 for changing one view 134 and trading display 116 according to certain embodiments of the disclosure. Method 500 begins at step 502, where trading application 130 receives a request to change a benchmark from a trader at a first quadrant, or expanded view, 134 and display 116. At decisional step 504, trading application 130 determines if the requested benchmark is already represented in trading display 116. If the benchmark is already represented, then trading application 130 communicates an error message to the trader via display 116 at step 506. Otherwise, trading application 130 selects a replacement view or quadrant 134 based on the requested benchmark at step 508. Next, at step 510, trading application 130 queries central repository 110 based on the requested benchmark. According to certain embodiments, trading application 130 may query local market data 132 alternatively or in combination with central repository 110. At step 512, trading application receives the market data for the benchmark associated with the replacement quadrant 134. Trading application 130 then receives market data for one or more non-benchmark instruments associated with the replacement benchmark at step 514. Next, at step 516, trading application 130 generates the replacement view 134 based on the received data. During the generation process, trading application 130 may initialize the current market depth for each instrument in the replacement view 134. Moreover, trading application 130 may generate one identifiable GUI element for each instrument that includes an available market depth greater than one. Trading application 130 then replaces the first view with the generated replacement view at step 518. At step 520, trading application 130 regenerates, or repaints, customizable trading display 116 based on the replacement view and the views remaining in display 116. Once display 116 has been regenerated, then trading application presents the updated customizable trading display 116 to the trader or other appropriate user at step 522.

FIG. 5B illustrates an example method 550 for updating the viewable market depth of one of the instruments in trading display 116. Example method 550 begins at step 552, where trading application 130 receives a selection of one of the instruments in a first view in trading display 116. Next, at step 554, trading application 130 receives a request to display the available market depth at the selected instrument via an associated identifiable GUI element 210. As illustrated in FIGS. 2B-C, this identifiable GUI element 210 may comprise an arrow of a particular color or shading. Trading application 130 then determines if the selected instrument has any available market depth at decisional step 556. If not, then processing ends, trading application 130 communicates an error message to the trader, or any other appropriate response to an invalid request occurs. Otherwise, trading application 130 expands the first quadrant 134 to include the requested market depth for the selected instrument at step 558. Trading application 130 then determines if there is a second quadrant 134 associated with first view 134 at decisional step 560. For example, first and second quadrants 134 may be substantially adjacent in display 116. If two or more quadrants 134 are associated, then trading application 130 expands the size of at least the second view 134 to match expanded first quadrant 134 at step 562. Part of this expansion process may include trading application 130 scaling the remaining views 134 and display 116 to maintain an appropriate size of display 116. Next, at step 564, trading application 130 stores the current market depth sentence for each instrument and the views 134 for subsequent generation. Once the appropriate views 134 have been expanded and, as appropriate, scaled, then trading application 130 regenerates display 116 based on the updated views 134 and presents display 116 to the trader.

The preceding flowcharts focus on the operation of example trading system 100 described in FIG. 1, as this diagram illustrates functional elements that provide for the preceding techniques for presenting and processing customizable trading display 116. However, as noted, trading system 100 contemplates using any suitable combination and arrangement of functional elements for providing these operations, and these techniques can be combined with other techniques as appropriate. Further, various changes may be made to the preceding flowcharts without departing from the scope of this disclosure. For example, many of the steps in these flowcharts may take place simultaneously and/or in different orders than as shown. Moreover, trading system 100 may implement methods with additional steps, fewer steps, and/or different steps, so long as the methods remain appropriate.

Figure 6A:
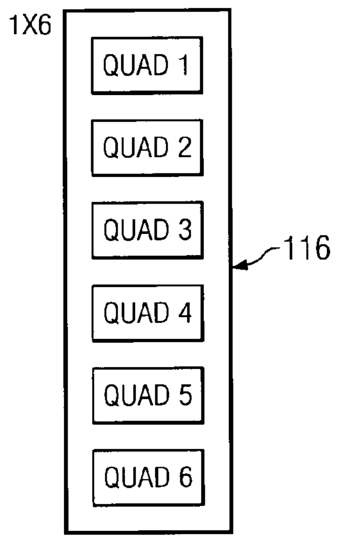
FIGS. 6A-D illustrate example selectable layouts of expandable quadrants in the customizable trading display presented by the trading system of FIG. 1.
Figure 6B:
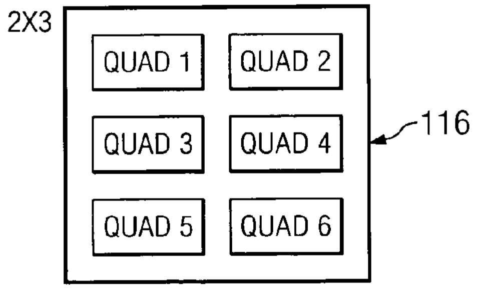
Figure 6C:
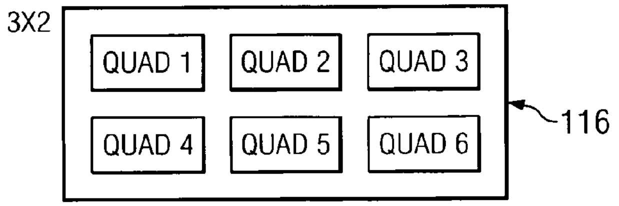
Figure 6D:
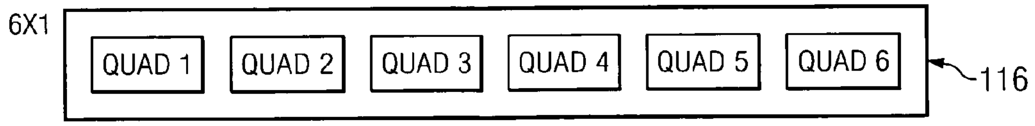

FIGS. 6A-D illustrate various example selectable layouts of expandable quadrants in customizable trading display 116. Each example layout comprises six quadrants (or views) 134. But it will be understood that FIGS. 6A-D are for illustration purposes only and trading display 116 may present any suitable number of quadrants 134 in any particular configuration or layout. For example, FIG. 6A illustrates trading display 116 with six quadrants 134 in a 1×6 layout. In another example, FIG. 6B illustrates trading display 116 with six quadrants 134 in a 2×3 layout. In a further example, FIG. 6C illustrates trading display 116 with six quadrants 134 in a 3×2 layout. In yet another example, FIG. 6D illustrates trading display 116 with six quadrants 134 in a 6×1 layout. Certain layouts may not be enabled for a subset of (or all) traders using trading application 130 via a configuration file or other dynamically configurable components. Put another way, trading display 116 allows the trader, within allowable options, to dynamically select one from available layouts of quadrants 134. Moreover, one layout may be dynamically selected by the administrator as a default layout for one or more traders. Further, the trader may be permitted to swap or exchange two quadrants 134 within the selected layout, whether the two quadrants 134 were previously presented in display 116 or not.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:

receiving by a computing device a selection of a quadrant from a plurality of quadrants, in which each quadrant comprises a portion of a customizable display and each quadrant comprises a benchmark instrument, the selected quadrant comprising a first benchmark instrument;

retrieving by a computing device a plurality of non-benchmark instruments from a server coupled to the computing device over a network, in which each non-benchmark instrument shares at least one variable in common with the first benchmark instrument, and in which the first benchmark instrument comprises a first type of instrument, and in which the one of the plurality of non-benchmark instruments comprises a second type of instrument that is different from the first type;

retrieving from a server market data for the first benchmark instrument and the plurality of non-benchmark instruments; and generating and outputting the customizable display in accordance to a layout, in which the customizable display comprises the selected quadrant and a plurality of other quadrants, and in which the selected quadrant comprises the retrieved market data for the first benchmark instrument and the plurality of non-benchmark instruments.

2. The method of claim 1, in which the layout is selected from a plurality of layouts.

3. The method of claim 1, in which the layout comprises at least one of:

1×6;
2×3;
3×2; and
6×1.

4. The method of claim 1 further comprising:
receiving a request to replace the layout of the customizable display with a second layout.

5. The method of claim 1 further comprising:
receiving a request to replace the first benchmark instrument with a second benchmark instrument, in which the first benchmark instrument is associated with the selected quadrant;
selecting a second quadrant, in which the second quadrant comprises the second benchmark instrument;
removing the selected quadrant from a position in the layout; and
updating the customizable display to include the second quadrant, in which the second quadrant is located in the position that was formerly occupied by the selected quadrant.

6. The method of claim 1 further comprising:
receiving a request to exchange a position of a first quadrant in the layout with the position of a second quadrant in the layout.

7. The method of claim 6 further comprising:
determining that the request to exchange is a permissible option; and
updating the customizable display, in which the layout of the updated customizable display comprises the first quadrant being located in the position that was formerly occupied by the second quadrant and the second quadrant being located in the position of that was formerly occupied by the first quadrant.

8. The method of claim 1 further comprising:
receiving a request to add a third benchmark instrument to the customizable display;
selecting a third quadrant, in which the third quadrant comprises the third benchmark instrument;
replacing the layout that was previously used by the customizable display with a second layout, in which the second layout decreases a size of each quadrant from the previous layout in order to accommodate the size of the third quadrant; and
generating the customizable display in accordance to the second layout, in which the customizable display comprises the third quadrant.

9. The method of claim 8, in which the size of each quadrant comprises a minimum requirement.

10. The method of claim 1, in which the customizable display comprises a maximum quantity of quadrants.

11. The method of claim 1, in which at least one of the first type of instrument and the second type of instrument comprises at least one of: a bond, a futures contract, a stock, a debt instrument, an equity, and another type of instrument.

12. An apparatus comprising:
a processor; and
a memory, in which the memory stores instructions which, when executed by the processor, direct the processor to:
receive by a computing device a selection of a quadrant from a plurality of quadrants, in which each quadrant comprises a portion of a customizable display and each quadrant comprises a benchmark instrument, the selected quadrant comprising a first benchmark instrument;
retrieve by a computing device a plurality of non-benchmark instruments from a server coupled to the computing device over a network, in which each non-benchmark instrument shares at least one variable in common with the first benchmark instrument, and in which the first benchmark instrument comprises a first type of instrument, and in which the one of the plurality of non-benchmark instruments comprises a second type of instrument that is different from the first type;
retrieve from a server market data for the first benchmark instrument and the plurality of non-benchmark instruments; and
generate and output the customizable display in accordance to a layout, in which the customizable display comprises the selected quadrant and a plurality of other quadrants, and in which the selected quadrant comprises the retrieved market data for the first benchmark instrument and the plurality of non-benchmark instruments.

13. The apparatus of claim 12, in which the layout comprises at least one of:
1×6;
2×3;
3×2; and
6×1.

14. The apparatus of claim 12, in which the storage medium stores instructions which, when executed by the processor, further direct the processor to receive a request to replace the layout of the customizable display with a second layout.

15. The apparatus of claim 12, in which the storage medium stores instructions which, when executed by the processor, further direct the processor to receive a request to exchange a position of a first quadrant in the layout with the position of a second quadrant in the layout.

16. The apparatus of claim 15, in which the storage medium stores instructions which, when executed by the processor, further direct the processor to:
determine that the request to exchange is a permissible option; and
update the customizable display, in which the layout of the updated customizable display comprises the first quadrant being located in the position that was formerly occupied by the second quadrant and the second quadrant being located in the position of that was formerly occupied by the first quadrant.

17. The apparatus of claim 12, in which the storage medium stores instructions which, when executed by the processor, further direct the processor to:
receive a request to add a third benchmark instrument to the customizable display;
select a third quadrant, in which the third quadrant comprises the third benchmark instrument;
replace the layout that was previously used by the customizable display with a second layout, in which the second layout decreases a size of each quadrant from the previous layout in order to accommodate the size of the third quadrant; and
generate the customizable display in accordance to the second layout, in which the customizable display comprises the third quadrant.

18. The apparatus of claim 12, in which at least one of the first type of instrument and the second type of instrument comprises at least one of: a bond, a futures, a stock, a debt, an equity, and another type of instrument.

19. An article of manufacture comprising:
a storage medium, in which the storage medium stores instructions which, when executed by a processor, direct the processor to:
receive by a computing device a selection of a quadrant from a plurality of quadrants, in which each quadrant comprises a portion of a customizable display and each quadrant comprises a benchmark instrument, the selected quadrant comprising a first benchmark instrument;

retrieve by a computing device a plurality of non-benchmark instruments from a server coupled to the computing device over a network, in which each non-benchmark instrument shares at least one variable in common with the first benchmark instrument, and in which the first benchmark instrument comprises a first type of instrument, and in which the one of the plurality of non-benchmark instruments comprises a second type of instrument that is different from the first type;

retrieve from a server market data for the first benchmark instrument and the plurality of non-benchmark instruments; and generate and output the customizable display in accordance to a layout, in which the customizable display comprises the selected quadrant and a plurality of other quadrants, and in which the selected quadrant comprises the retrieved market data for the first benchmark instrument and the plurality of non-benchmark instruments.

20. The article of manufacture of claim 19, in which the layout comprises at least one of:

1×6;

2×3;

3×2; and

6×1.

21. The article of manufacture of claim 19, in which the storage medium stores instructions which, when executed by the processor, further direct the processor to receive a request to replace the layout of the customizable display with a second layout.

22. The article of manufacture of claim 19, in which the storage medium stores instructions which, when executed by the processor, further direct the processor to receive a request to exchange a position of a first quadrant in the layout with the position of a second quadrant in the layout.

23. The article of manufacture of claim 22, in which the storage medium stores instructions which, when executed by the processor, further direct the processor to:

determine that the request to exchange is a permissible option; and update the customizable display, in which the layout of the updated customizable display comprises the first quadrant being located in the position that was formerly occupied by the second quadrant and the second quadrant being located in the position of that was formerly occupied by the first quadrant.

24. The article of manufacture of claim 19, in which the storage medium stores instructions which, when executed by the processor, further direct the processor to:

receive a request to add a third benchmark instrument to the customizable display;

select a third quadrant, in which the third quadrant comprises the third benchmark instrument;

replace the layout that was previously used by the customizable display with a second layout, in which the second layout decreases a size of each quadrant from the previous layout in order to accommodate the size of the third quadrant; and generate the customizable display in accordance to the second layout, in which the customizable display comprises the third quadrant.

25. The article of manufacture of claim 19, in which at least one of the first type of instrument and the second type of instrument comprises at least one of: a bond, a futures contract, a stock, a debt instrument, an equity, and another type of instrument.

* * * * *